US010860117B2

(12) United States Patent
Cho et al.

(10) Patent No.: US 10,860,117 B2
(45) Date of Patent: Dec. 8, 2020

(54) METHOD FOR DISPLAYING OBJECT AND ELECTRONIC DEVICE THEREOF

(71) Applicant: Samsung Electronics Co., Ltd., Gyeonggi-do (KR)

(72) Inventors: Yongjin Cho, Gyeonggi-do (KR); Ki-Hwan Kim, Gyeonggi-do (KR); Jongyoon Kim, Seoul (KR); Moonki Yeo, Seoul (KR); Daekyu Lee, Seoul (KR); Sung Yeon Lee, Gyeonggi-do (KR); Yong Sang Yun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/468,193

(22) PCT Filed: Dec. 1, 2017

(86) PCT No.: PCT/KR2017/013993
§ 371 (c)(1),
(2) Date: Jun. 10, 2019

(87) PCT Pub. No.: WO2018/105955
PCT Pub. Date: Jun. 14, 2018

(65) Prior Publication Data
US 2019/0384420 A1 Dec. 19, 2019

(30) Foreign Application Priority Data
Dec. 8, 2016 (KR) .................. 10-2016-0166947

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/014* (2013.01); *G06F 3/017* (2013.01); *G06F 3/0383* (2013.01);
(Continued)

(58) Field of Classification Search
CPC .......... G06F 3/011; G06F 3/014; G06F 3/017; G06F 3/0346; G06F 3/0383;
(Continued)

(56) References Cited

U.S. PATENT DOCUMENTS 7,852,318 B2   12/2010  Altman
8,629,835 B2   1/2014   Lee et al.
(Continued)

FOREIGN PATENT DOCUMENTS

EP   2 953 007    12/2015
KR   100948806    3/2010
(Continued)

OTHER PUBLICATIONS

European Search Report dated Nov. 26, 2019 issued in counterpart application No. 17878944.2-1216, 11 pages.
(Continued)

*Primary Examiner* — Stacy Khoo
(74) *Attorney, Agent, or Firm* — The Farrell Law Firm, P.C.

(57) ABSTRACT

The present invention is for controlling an input dimension in an electronic device, and an operation method of the electronic device includes: an operation for measuring the distance between the electronic device and the ground; and operation for transmitting, to another electronic device, first information about two-dimensional coordinates representing the position of the electronic device, when the distance is shorter than a threshold value; and an operation for transmitting, to the other electronic device, second informa-
(Continued)

tion about three-dimensional coordinates representing the position of the electronic device, when the distance is not shorter than the threshold value.

17 Claims, 30 Drawing Sheets

(51) Int. Cl.
    *G06F 3/038*     (2013.01)
    *G06F 3/0481*     (2013.01)

(52) U.S. Cl.
    CPC .. *G06F 3/04815* (2013.01); *G06F 2203/0331* (2013.01)

(58) Field of Classification Search
    CPC .. G06F 3/0481; G06F 3/04815; G06F 3/0485; G06F 2203/0331
    See application file for complete search history.

(56) References Cited

U.S. PATENT DOCUMENTS

| | | | | |
|---|---|---|---|---|
| 2002/0084114 A1* | 7/2002 | Xu | | G06F 3/03545 |
| | | | | 178/19.07 |
| 2007/0060228 A1* | 3/2007 | Akasaka | | A63F 13/10 |
| | | | | 463/1 |
| 2009/0201289 A1* | 8/2009 | Kim | | G06F 3/0346 |
| | | | | 345/419 |
| 2010/0156785 A1* | 6/2010 | Nakaoka | | G06F 3/0346 |
| | | | | 345/157 |
| 2011/0296351 A1* | 12/2011 | Ewing, Jr. | | G06F 3/0346 |
| | | | | 715/841 |
| 2014/0282051 A1* | 9/2014 | Cruz-Hernandez | | G06F 3/016 |
| | | | | 715/744 |
| 2014/0320383 A1 | 10/2014 | Goto et al. | | |
| 2014/0364208 A1 | 12/2014 | Perry | | |
| 2015/0220158 A1 | 8/2015 | Elangovan et al. | | |
| 2015/0352437 A1 | 12/2015 | Koseki et al. | | |
| 2016/0041618 A1 | 2/2016 | Poupyrev | | |
| 2016/0077587 A1 | 3/2016 | Kienzle et al. | | |
| 2016/0214015 A1 | 7/2016 | Osman et al. | | |
| 2017/0185160 A1 | 6/2017 | Cho et al. | | |
| 2018/0004309 A1* | 1/2018 | Kinrot | | G06F 3/0325 |
| 2018/0032161 A1* | 2/2018 | Shi | | G01S 5/22 |

FOREIGN PATENT DOCUMENTS

| | | |
|---|---|---|
| KR | 1020110063075 | 6/2011 |
| KR | 1020140102663 | 8/2014 |
| KR | 1020160018690 | 2/2016 |
| KR | 1020170076534 | 7/2017 |

OTHER PUBLICATIONS

PCT/ISA/210 Search Report issued on PCT/KR2017/013993 (pp. 5).

PCT/ISA/237 Written Opinion issued on PCT/KR2017/013993 (pp. 4).

* cited by examiner

1901 — Pointer object

2103

102

METHOD FOR DISPLAYING OBJECT AND ELECTRONIC DEVICE THEREOF

PRIORITY

This application is a National Phase Entry of PCT International Application No. PCT/KR2017/013993, which was filed on Dec. 1, 2017, and claims priority to Korean Patent Application No. 10-2016-0166947, which was filed on Dec. 8, 2016, the content of each of which are incorporated herein by reference.

TECHNICAL FIELD

Various embodiments of the disclosure relate to a method and an electronic device for displaying an object.

BACKGROUND ART

Thanks to the remarkable advance of information communication technology and semiconductor technology, the spread and use of electronic devices (e.g., mobile terminals) are rapidly increasing. As the electronic devices become widespread, the electronic devices provide a variety of content to users.

Recently, a variety of electronic devices have been developed so as to be worn directly on the body. Such electronic devices may be referred to as "wearable devices". The wearable devices may be implemented in any of various forms that can be attached to and detached from body parts or clothes. For example, the wearable device may be mounted on the user's head, and the device that can be mounted on the head may include a head-mounted device (HMD). As another example, the wearable devices may include head-mounted displays, smart glasses, smart watches, smart bands, contact-lens type devices, ring type devices, shoes type devices, clothes type devices, glove type devices, and the like. In addition, wearable devices may be worn directly on the body to improve portability and accessibility. That is, the wearable devices may eliminate the inconvenience of carrying an electronic device, such as a smartphone, separately, and may facilitate access of the user to the electronic device.

DISCLOSURE OF INVENTION

Technical Problem

Various embodiments of the disclosure provide a method and a device for displaying a two-dimensional or three-dimensional pointer object depending on the distance between a control device and the ground.

Various embodiments of the disclosure provide a method and a device for transmitting two-dimensional or three-dimensional coordinates indicating the position of a control device depending on the distance between a control device and the ground.

Various embodiments of the disclosure provide a method and a device for controlling the movement of a two-dimensional or three-dimensional pointer object depending on the distance between a control device and the ground.

Various embodiments of the disclosure provide a method and a device for determining two-dimensional or three-dimensional coordinate axes for displaying a pointer object depending on the distance between a control device and the ground.

Various embodiments of the disclosure provide a method and a device for detecting a finger gesture of a user according to the determination that the distance between a control device and the ground is equal to or less than a threshold value.

Solution to Problem

In order to overcome the problems described above, a method of operating an electronic device according to an embodiment of the disclosure may include: measuring a distance between the electronic device and a ground; if the distance is less than a threshold value, transmitting, to another electronic device, first information about two-dimensional coordinates indicating the position of the electronic device; and if the distance is not less than the threshold value, transmitting, to the another electronic device, second information about the three-dimensional coordinates indicating the position of the electronic device.

A method of operating an electronic device according to another embodiment of the disclosure may include: receiving, from another electronic device, first data to indicate three-dimensional movement of the other electronic device and second data to indicate a distance between the other electronic device and the ground or third data to indicate whether or not the distance is equal to or greater than a threshold value; determining whether or not the distance is equal to or greater than the threshold value on the basis of the second data and the third data; if the distance is not equal to or greater than the threshold value, processing the first data to indicate the three-dimensional movement into data to indicate two-dimensional movement; and if the distance is equal to or greater than the threshold value, processing the first data to indicate the three-dimensional movement.

A method of operating an electronic device according to another embodiment of the disclosure may include: receiving, from another electronic device, data on movement of the other electronic device; if the data is first data to indicate two-dimensional movement, displaying movement of an object in a first operation manner; and if the data is second data to indicate three-dimensional movement, displaying movement of another object in a second operation manner.

Advantageous Effects of Invention

According to the disclosure, an electronic device may provide a method for displaying and controlling a two-dimensional or three-dimensional pointer object depending on the distance between a control device and the ground, thereby providing convenience of input.

BEST MODE FOR CARRYING OUT THE INVENTION

Figure 1:
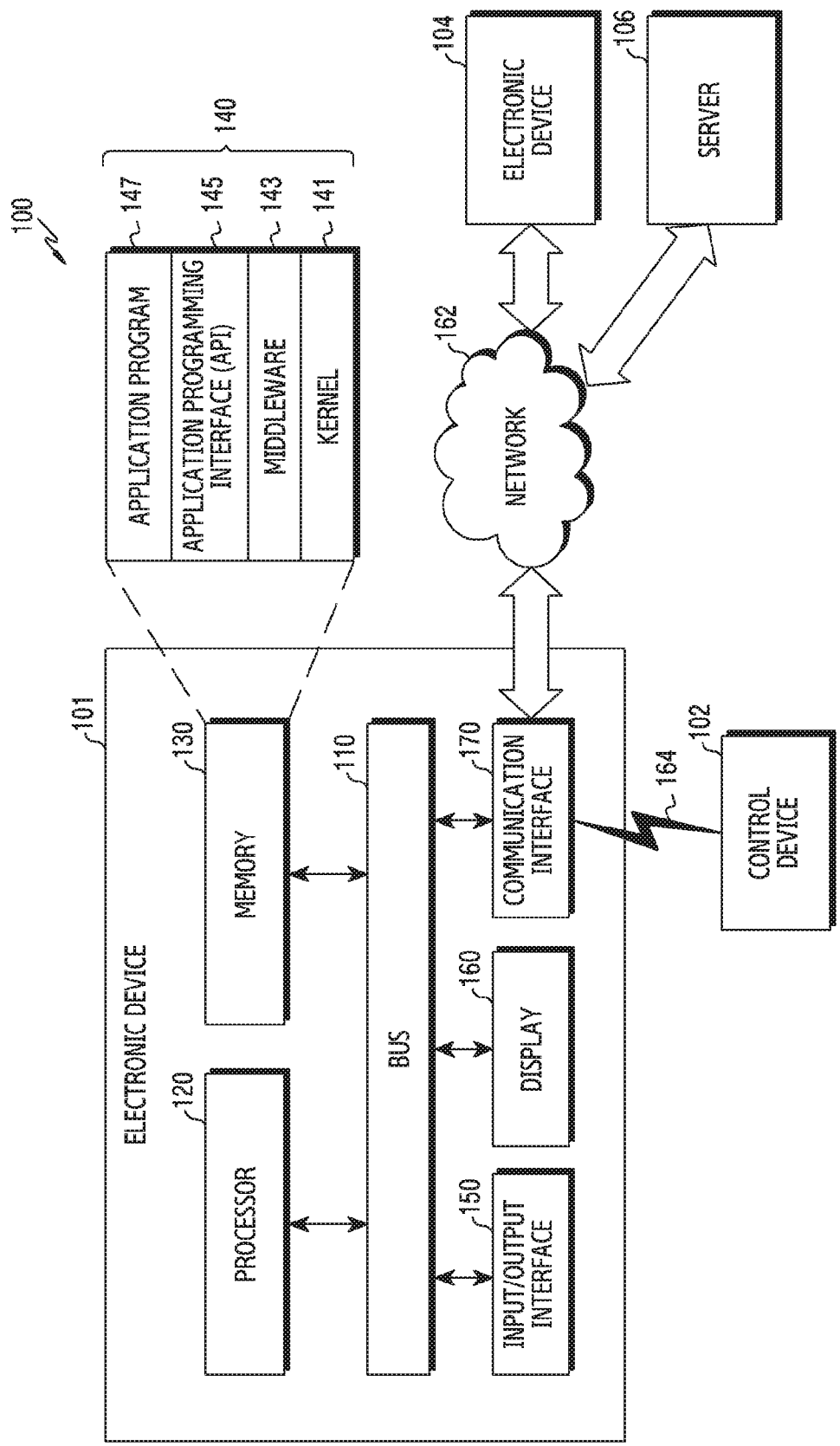
FIG. 1 illustrates an example of a network environment including an electronic device according to various embodiments of the disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. In the present disclosure, the expression "A or B", "at least one of A or/and B", or "one or more of A or/and B" may include all possible combinations of the items listed. The expression "a first" "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to embodiments of the present disclosure is not limited to the aforementioned devices, and may include a new electronic device according to the development of technology. Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

Prior to describing the disclosure, a pointer object used herein is defined as follows. "Pointer object" denotes an interface element that indicates the current position on the displayed screen. In addition, the pointer object may refer to an interface element for pressing a button on the displayed screen or specifying a range thereon. The pointer object may be referred to as another name, such as "pointer", "indication object", "indication icon", "item", or "object" depending on its technical meaning.

FIG. 1 illustrates an example of an electronic device 101 in a network environment 100 including according to various embodiments of the disclosure.

Referring to FIG. 1, an electronic device 101 in a network environment 100 is described in various embodiments. The electronic device 101 may include a bus 110, a processor 120, a memory 130, an input/output interface 150, a display 160, and a communication interface 170. In some embodiments, the electronic device 101 may exclude one or more elements, or may add other elements thereto. The bus 110 may include a circuit for connecting the elements 110 to 170 to each other and transmitting communications (e.g., control messages or data) between the elements. The processor 120 may include at least one of a central processing unit, an application processor, or a communication processor (CP). The processor 120, for example, may perform calculation or data processing in relation to the control and/or communication of one or more other elements of the electronic device 101.

The memory 130 may include a volatile and/or non-volatile memory. For example, the memory 130 may store commands or data in relation to one or more other elements of the electronic device 101. According to an embodiment, the memory 130 may store software and/or programs 140. For example, the programs 140 may include a kernel 141, middleware 143, an application programming interface (API) 145, and/or application programs (or "applications") 147. At least some of the kernel 141, the middleware 143, or the API 145 may be referred to as an "operating system" (OS). The kernel 141, for example, may control or manage system resources (e.g., the bus 110, the processor 120, or the memory 130) used to execute the operation or function that is implemented in other programs (e.g., the middleware 143, the API 145, or the application programs 147). In addition, the kernel 141 may provide an interface that allows the middleware 143, the API 145, or the application programs 147 to access respective elements of the electronic device 101 for control or management of system resources.

The middleware 143, for example, may play the intermediate role between the API 145 or the application programs 147 and the kernel 141 to communicate with each other for the transmission and reception of data. In addition, the middleware 143 may process one or more operation requests received from the application programs 147 according to priority thereof. For example, the middleware 143 may give priority for using the system resources (e.g., the bus 110, the processor 120, or the memory 130) of the electronic device 101 to at least one of the application programs 147, and may process the one or more operation requests. The API 145 may be an interface by which the application programs 147 control functions provided by the kernel 141 or the middleware 143, and, for example, may include one or more interfaces or functions (e.g., instructions) for file control, window control, image processing, or text control. The input/output interface 150, for example, may transfer commands or data received from a user or other external devices to other elements of the electronic device 101, or may output commands or data received from other elements of the electronic device 101 to the user or the other external devices.

The display 160, for example, may include a liquid crystal display (LCD), a light-emitting diode (LED) display, an organic light-emitting diode (OLED) display, a micro-electromechanical system (MEMS) display, or an electronic paper display. For example, the display 160 may display a variety of content (e.g., text, images, videos, icons, symbols, and/or the like) to the user. The display 160 may include a touch screen, and may receive a touch input, a gesture input, a proximity input, or a hovering input using electronic pens or a user's body part. The communication interface 170, for example, may establish communication between the electronic device 101 and external devices (e.g., a control device 102, an electronic device 104, or a server 106). For example, the communication interface 170 may be connected to the network 162 through wireless communication or wired communication for communication with the external devices (e.g., the electronic device 104 or the server 106).

For example, the wireless communication may include cellular communication that uses at least one of LTE, LTE-A (LTE Advance), CDMA (code division multiple access), WCDMA (wideband CDMA), UMTS (universal mobile telecommunications system), WiBro (Wireless Broadband), GSM (Global System for Mobile Communications), or the like. According to an embodiment, the wireless communication may include at least one of, for example, WiFi (wireless fidelity), Bluetooth, Bluetooth low energy (BLE), Zigbee, NFC (near field communication), magnetic secure transmission, radio frequency (RF), or a body area network (BAN). According to an embodiment, the wireless communication may include a GNSS. The GNSS, for example, may be a GPS (Global Positioning System), a Glonsass (Global Navigation Satellite System), a Beidou navigation satellite system (hereinafter, "Beidou"), Galileo, or the European global satellite-based navigation system. Hereinafter, "GPS" may be used interchangeably with "GNSS" in the specification. For example, the wired communication may include at least one of a USB (universal serial bus), an HDMI (high definition multimedia interface), RS-232 (recommended standard 232), power line communication, a POTS (plain old telephone service), or the like. The network 162 may include at least one of telecommunication networks, such as a computer network (e.g., LAN or WAN), the Internet, or a telephone network.

The control device 102 communicates with the electronic device 101 using wireless communication or wired communication. The control device 102 may transmit, to the electronic device 101, input information for the electronic device 101. That is, the control device 102 may transmit, to the electronic device 101, input information for the electronic device 101, thereby controlling the electronic device 101. The control device 102 may receive input information directly from an external entity (e.g., a user or the electronic device 104). The control device 102 may process the input information received from the external entity, and may transmit the processed information to the electronic device 101. In addition, the control device 102 may perform calculation for processing the operations related to the control device 102.

The electronic device 104 may be the same as, or different from, the electronic device 101 as to the type thereof. According to various embodiments, at least all or some of the operations executed in the electronic device 101 may be executed by one or more other electronic devices (e.g., the electronic device 104 or the server 106). According to an embodiment, in the case where the electronic device 101 executes specific functions or services automatically or upon request, the electronic device 101 may make a request to the other devices (e.g., the electronic device 104 or the server 106) for at least some of the functions or services in addition to, or instead of, executing the same by itself. The other electronic devices (e.g., the electronic device 104 or the server 106) may execute the requested functions or additional functions, and may transfer the results thereof to the electronic device 101. The electronic device 101 may provide the requested function or service by providing the received result without change or by further processing the same. To this end, for example, cloud computing, distributed computing, or client-server computing technology may be used.

Figure 2:
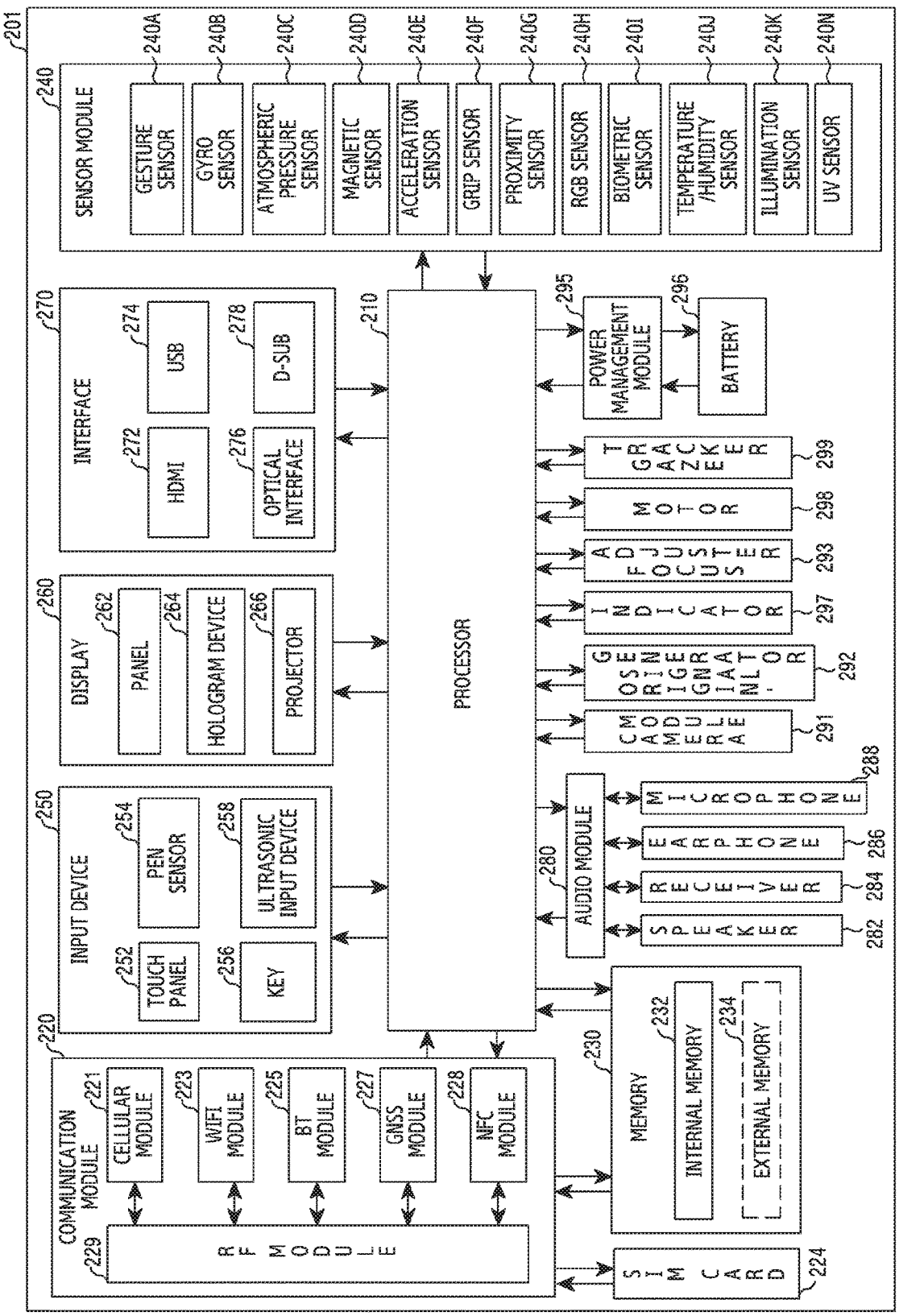
FIG. 2 illustrates an example of a block diagram of an electronic device according to various embodiments of the disclosure.

FIG. 2 is a block diagram of an electronic device 201 according to various embodiments.

Referring to FIG. 2, the electronic device 201 may include all or some of the elements of the electronic device 101 shown in FIG. 1. The electronic device 201 may include one or more processors (e.g., the AP) 210, a communication module 220, a subscriber identification module 224, a memory 230, a sensor module 240, an input device 250, a display 260, an interface 270, an audio module 280, a camera module 291, an origin-signal generator 292, a focus adjuster 293, a power management module 295, a battery 296, an indicator 297, a motor 298, and a gaze tracker 299.

The processor 210, for example, may control a multitude of hardware or software elements connected to the processor 210, and may perform processing of a variety of data and calculation by executing an operating system or application programs. For example, the processor 210 may control a multitude of hardware or software elements connected to the processor 210, and may perform processing of a variety of data and calculation by executing an operating system (OS) or application programs. The processor 210 may be implemented by, for example, an SoC (system on chip). According to an embodiment, the processor 210 may further include a GPU (graphic processing unit) and/or an image signal processor. The processor 210 may include at least some (e.g., a cellular module 221) of the elements shown in FIG. 2. The processor 210 may load commands or data received from at least one of other elements (e.g., a non-volatile memory) to a volatile memory, thereby processing the same, and may store the resultant data in a non-volatile memory.

The communication module 220 may have a configuration the same as or similar to that of the communication interface 170. The communication module 220, for example, may include a cellular module 221, a WiFi module 223, a Bluetooth module 225, a GNSS module 227, an NFC module 228, and an RF module 229. The communication module 220 may perform data transmission/reception by connecting a wearable device and a user device (e.g., a smartphone) using wired and/or wireless communication. The cellular module 221, for example, may provide services of voice calls, video calls, text messaging, or the Internet through communication networks. According to an embodiment, the cellular module 221 may perform identification and verification of the electronic device 201 in communication networks using the subscriber identification module (e.g., a SIM card) 224. According to an embodiment, the cellular module 221 may perform at least some of the functions provided by the processor 210. According to an embodiment, the cellular module 221 may include a communication processor (CP). According to an embodiment, at least some (e.g., two or more) of the cellular module 221, the WiFi module 223, the Bluetooth module 225, the GNSS module 227, or the NFC module 228 may be included in a single integrated chip (IC) or a single IC package. The RF module 229 may transmit and receive communication signals (e.g., RF signals). The RF module 229 may include, for example, a transceiver, a PAM (power amp module), a frequency filter, an LNA (low noise amplifier), antennas, or the like. According to another embodiment, at least one of the cellular module 221, the WiFi module 223, the Bluetooth module 225, the GNSS module 227, or the NFC module 228 may transmit and receive RF signals through a separate RF module. The subscriber identification module 224, for example, may include a card having a subscriber identification module or an embedded SIM, and may contain specific identification information (e.g., an ICCID (integrated circuit card identifier)) or subscriber information (e.g., an IMSI (international mobile subscriber identity)).

The memory 230 (e.g., the memory 130) may include an internal memory 232 or an external memory 234. The internal memory 232, for example, may include at least one of a volatile memory (e.g., a DRAM, an SRAM, an SDRAM, or the like) or a non-volatile memory (e.g., an OTPROM (one time programmable ROM), a PROM, an EPROM, an EEPROM, a mask ROM, a flash ROM, a flash memory, a hard drive, a solid state drive (SSD), or the like). The external memory 234 may include a flash drive, and, for example, may include CF (compact flash), SD (secure digital), Micro-SD, Mini-SD, xD (extreme digital), an MMC (multi-media card), a memory stick, or the like. The external memory 234 may be functionally or physically connected with the electronic device 201 through any of various interfaces.

The sensor module 240, for example, may measure physical quantities, or may detect the state of operation of the electronic device 201, thereby converting the measured or detected information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an RGB (red, green, and blue) sensor), a biometric sensor 240I, a temperature/humidity sensor 240J, an illuminance sensor 240K, or a UV (ultraviolet) sensor 240M. Alternatively or additionally, the sensor module 240, for example, may further include an e-nose sensor, an electromyography (EMG) sensor, an electroencephalogram (EEG) sensor, an electrocardiogram (ECG) sensor, an IR (infrared) sensor, an iris sensor, and/or a fingerprint sensor. The sensor module 240 may further include a control circuit for controlling one or more sensors included therein. In some embodiments, the electronic device 201 may further include a processor as a part of the processor 210 or separately from the processor 210, which is configured to control the sensor module 240, thereby controlling the sensor module 240 while the processor 210 is in a sleep mode. In another embodiment, the electronic device 201 may detect the head motion of a user who is wearing the electronic device 201 using an acceleration sensor 240E, a gyro sensor 240B, and a geomagnetic sensor 240N. In another embodiment, if the user wears the electronic device 201, the electronic device 201 may detect at least one of IR recognition, pressure recognition, and variations in the capacitance (or permittivity), thereby determining whether or not the user is wearing the electronic device 201. In another embodiment, the gesture sensor 240A may detect gestures of the user's hand or fingers to thus transmit information about the gestures to the processor 210, so that the processor 210 may determine the gestures to be inputs.

The input device 250, for example, may include a touch panel 252, a (digital) pen sensor 254, keys 256, or an ultrasonic input device 258. The touch panel 252 may be implemented using at least one of, for example, a capacitive type, a pressure-sensitive type, an infrared type, or an ultrasonic type. In addition, the touch panel 252 may further include a control circuit. The touch panel 252 may further include a tactile layer, thereby providing a user with a tactile reaction. For example, the (digital) pen sensor 254 may be a part of the touch panel, or may include a separate recognition sheet. The keys 256 may include, for example, physical buttons, optical keys, or a keypad. The ultrasonic input device 258 may detect ultrasonic waves that are generated in the input means through a microphone (e.g., a microphone 288), thereby identifying data corresponding to the ultrasonic waves.

The display 260 (e.g., the display 160) may include a panel 262, a hologram device 264, a projector 266, and/or a control circuit for controlling the same. The panel 262 may be implemented to be, for example, flexible, transparent, or wearable. The panel 262 may be configured as one or more modules together with the touch panel 252. According to an embodiment, the panel 262 may include a pressure sensor (or a force sensor) capable of measuring the intensity of pressure with respect to a user's touch. The pressure sensor may be implemented to be integral with the touch panel 252, or may be implemented as one or more sensors separated from the touch panel 252. The hologram device 264 may display 3D images in the air using light interference. The projector 266 may display images by projecting light onto a screen. The screen may be positioned, for example, inside or outside the electronic device 201. The interface 270 may include, for example, at least one of an HDMI 272, a USB 274, an optical interface 276, or a D-sub (D-subminiature) 278. The interface 270 may be included in, for example, the communication interface 170 shown in FIG. 1. Additionally or alternatively, the interface 270 may include, for example, an MHL (mobile high-definition link) interface, an SD card/MMC (multi-media card) interface, or an IrDA (infrared data association) standard interface.

The audio module 280, for example, may convert a sound into an electric signal, and vice versa. At least some elements of the audio module 280 may be included, for example, in the input/output interface 145 shown in FIG. 1. For example, the audio module 280 may process voice information that is input or output through a speaker 282, a receiver 284, earphones 286, or a microphone 288. The camera module 291, for example, may be a device for taking still and moving images, and, according to an embodiment, the camera module 291 may include one or more image sensors (e.g., a front sensor or a rear sensor), lenses, an image signal processor (ISP), or a flash (e.g., an LED or a xenon lamp). The power management module 295, for example, may manage the power of the electronic device 201. According to an embodiment, the power management module 295 may include a PMIC (power management integrated circuit), a charger integrated circuit (IC), or a battery or fuel gauge. The PMIC may be implemented as a wired charging type and/or a wireless charging type. The wireless charging type may encompass, for example, a magnetic resonance type, a magnetic induction type, or an electromagnetic wave type, and may further include additional circuits for wireless charging, such as coil loops, resonance circuits, or rectifiers. The battery gauge may measure, for example, the remaining power of the battery 296, a charging voltage, current, or temperature. The battery 296 may include, for example, a rechargeable battery and/or a solar battery.

The origin-signal generator 292 generates a magnetic field by passing a current through a three-axis coil included in the origin-signal generator 292. That is, the origin-signal generator 292 generates a magnetic field with respect to a specific alternating current frequency in three axes. As the origin-signal generator 292 generates a magnetic field, the position of the electronic device 201 becomes a reference point with respect to the position of the control device 102. The magnetic field may be referred to as an "origin signal".

The focus adjuster 293 may adjust the focus of the user's gaze. Specifically, the focus adjuster 293 may measure the inter-pupil distance (IPD) of the user, and may adjust the distance of lenses and the position of a display of the electronic device 201 so that the user may view an image suitable for the user's eyesight.

The indicator 297 may display the specific state of the electronic device 201 or a part (e.g., the processor 210) thereof, such as a booting state, a message state, or a charging state. The motor 298 may convert an electric signal to a mechanical vibration, and may provide a vibration or a haptic effect.

The gaze tracker 299 may identify the point at which the user gazes. More specifically, if a micro-camera included in the gaze tracker 299 has two light sources, two reflection points may be generated on the corneal surface of the user's eye using the two light sources. Thus, the gaze tracker 299 may determine the center point of the two generated reflection points, and may track the point at which the user gazes using the center point of the pupil and the center point of the two reflection points. In some embodiments, the gaze tracker 299 may track a user's gaze using at least one of EOG (electrooculography), a coil system, a dual purkinje system, a bright pupil system, and a dark pupil system. In addition, the gaze tracker 299 may include a micro-camera for tracking a user's gaze.

The electronic device 201 may include a device (e.g., a GPU) for supporting mobile TV, which may process media data according to standards, such as, DMB (digital multimedia broadcasting), DVB (digital video broadcasting), mediaFlo™, or the like. The respective elements described in this specification may include one or more components, and the names of the corresponding elements may vary depending on the type of electronic device. In various embodiments, the electronic device 201 may exclude some elements, or may include additional elements, or some of the elements may be combined into a single entity that performs the same functions as those of the original elements. In addition, in various embodiments, some of the elements shown in FIG. 2 may be included in the wearable device, and the remaining elements may be included in the user device.

Figure 3:
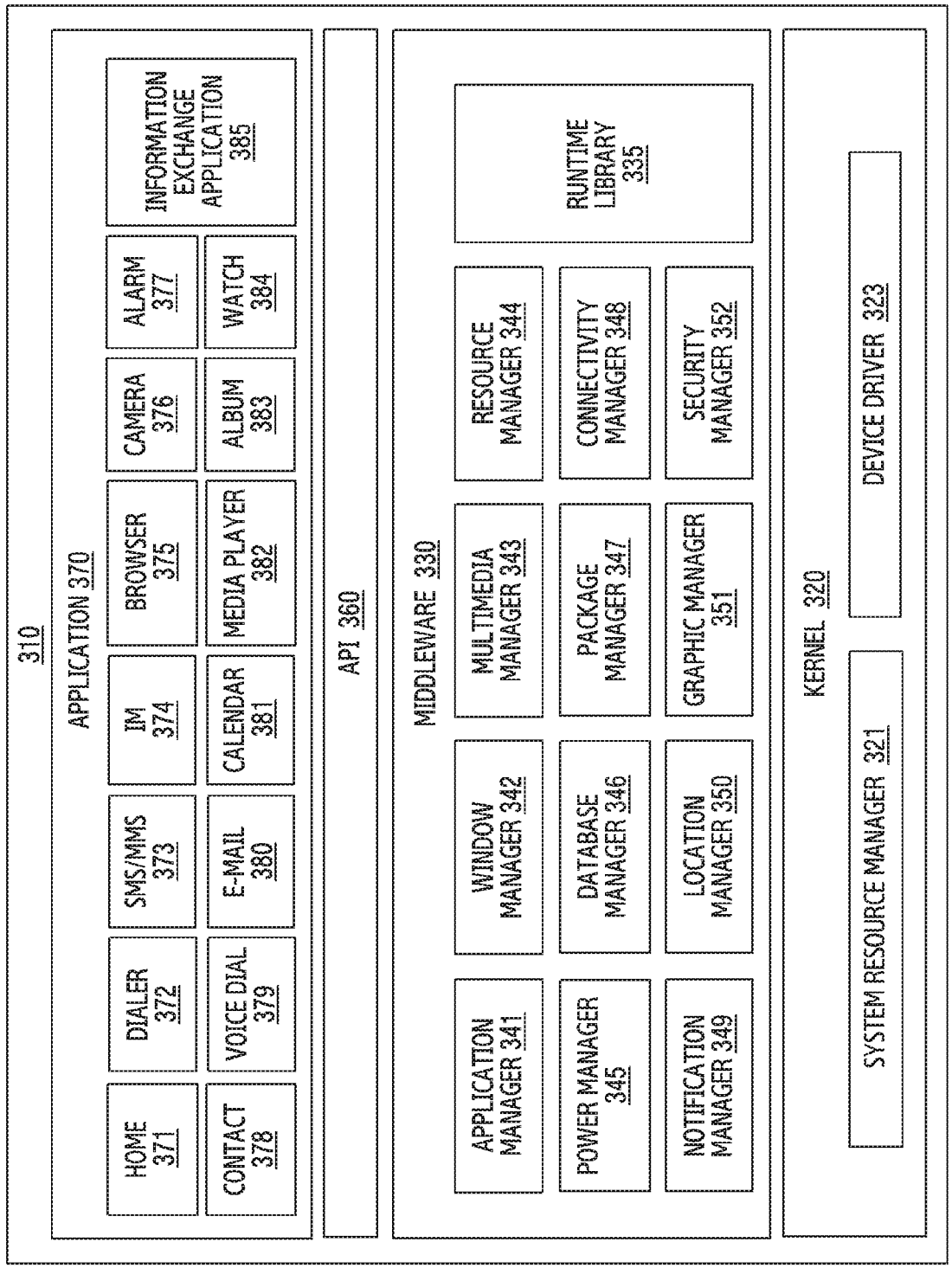
FIG. 3 illustrates an example of a block diagram of a program module according to various embodiments of the disclosure.

FIG. 3 is a block diagram illustrating a configuration of a program module, according to various embodiments of the present disclosure;

According to an embodiment of the present disclosure, the program module 310 may include an OS for controlling resources related to the electronic device 101 and/or applications 147 executed in the OS. The OS may comprise Android™, iOS™, Windows™, Symbian™, Tizen™, Bada™, etc. Referring to FIG. 3, the program module 310 may include a kernel 320, middleware 330, an API 360, and/or applications 370. According to various embodiments of the present disclosure, at least some of the program module 310 may be preloaded on an electronic device, or may be downloaded from an external electronic device (e.g., the electronic device 102 or 104, or the server 106).

The kernel 320 may include a system resource manager 321 and/or a device driver 323. The system resource manager 321 may control, allocate, or collect system resources. According to various embodiments of the present disclosure, the system resource manager 321 may include a process management unit, a memory management unit, a file system management unit, etc. The device driver 323 may include a display driver, a camera driver, a Bluetooth™ driver, a shared memory driver, a USB driver, a keypad driver, a Wi-Fi driver, an audio driver, or an inter-process communication (IPC) driver. The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 may include a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

According to various embodiments of the present disclosure, runtime library 335 may include a library module which a compiler uses in order to add a new function through a programming language while an application 370 is being executed. The runtime library 335 may perform input/output management, memory management, the functionality for an arithmetic function, etc. According to various embodiments of the present disclosure, the application manager 341 may manage, a life cycle of the applications 370. The window manager 342 may manage the graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. According to various embodiments of the present disclosure, power manager 345 may operate together with a basic input/output system (BIOS) or the like to manage a battery or power source, and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, etc. in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, etc. According to an embodiment of the present disclosure, when the electronic device 101 provides a telephone call function, the middleware 330 may further include a telephony manager for managing a voice call function or a video call function of the electronic device. According to various embodiments of the present disclosure, middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components. The API 360 includes a set of API programming functions, and may be provided with a different configuration according to an OS. In the case of Android or iOS, one API set may be provided for each platform. In the case of Tizen, two or more API sets may be provided for each platform.

The applications 370 may include one or more applications which provide functions such as a home 371 application, a dialer 372 application, an SMS/MMS 373 application, an instant message (IM) 374 application, a browser 375 application, a camera 376 application, an alarm 377 application, a contacts 378 application, a voice dial 379 application, an email 380 application, a calendar 381 application, a media player 382 application, an album 383 application, a watch 384 application, a healthcare application (e.g., measuring exercise quantity or blood sugar level), or an environment information application (e.g., providing atmospheric pressure, humidity, or temperature information). According to various embodiments of the present disclosure, applications 370 may include an information exchange application 385 that can support the exchange of information between the electronic device and an external electronic device. The information exchange application 385 may include a notification relay application for transferring specific information to an external electronic device or a device management application for managing an external electronic device. According to various embodiments of the present disclosure, the notification relay application may include a function of transferring, to the external electronic device, notification information generated from other applications of the electronic device 101 (e.g., an SMS/MMS application, an e-mail application, a health management application, or an environmental information application). Further, the notification relay application may receive notification information from an external electronic device and provide the received notification information to a user. According to various embodiments of the present disclosure, the device management application may manage (e.g., install, delete, or update) at least one function of an external electronic device communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service). According to various embodiments of the present disclosure, the applications 370 may include applications (e.g., a healthcare application of a mobile medical appliance or the like) designated according to an external electronic device. The applications 370 may include an application received from an external electronic device. The applications 370 may include a preloaded application or a third party application that may be downloaded from a server. The names of the components of the program module 310 may change depending on the type of OS. According to various embodiments of the present disclosure, at least a part of the programming module 310 may be implemented in software, firmware, hardware, or a combination of two or more thereof. At least some of the program module 310 may be implemented (e.g., executed) by the processor. At least some of the program module 310 may include a module, a program, a routine, a set of instructions, and/or a process for performing one or more functions.

Figure 4:
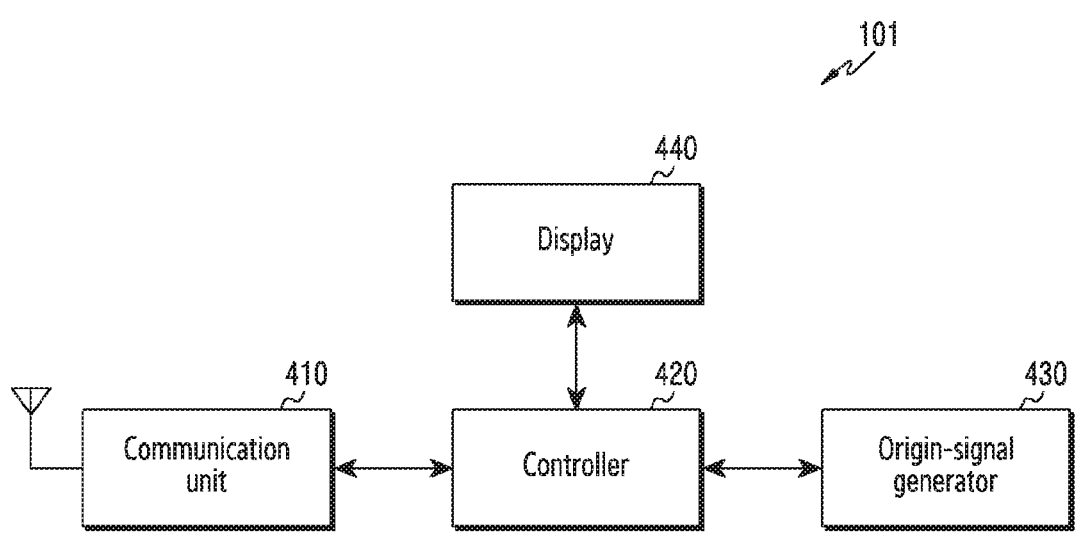
FIG. 4 illustrates an example of a functional configuration of an electronic device according to various embodiments of the disclosure.

FIG. 4 illustrates an example of a functional configuration of an electronic device 101 according to various embodiments of the disclosure.

Referring to FIG. 4, the electronic device 101 may include a communication unit 410, a controller 420, an origin-signal generator 430, and a display 440.

The communication unit 410 may receive radio frequency (RF) signals. To this end, the communication unit 410 may include at least one antenna. The communication unit 410 may down-convert the received signal in order to generate an intermediate-frequency (IF) or baseband signal. The communication unit 410 may include a reception processing circuit that filters, decodes, and/or digitizes the baseband signal or IF signal, thereby generating a processed baseband signal. The reception processing circuit may transmit the processed baseband signal to a speaker for voice data, or may transmit the same to the controller 420 for further processing (e.g., web browsing data). The communication unit 410 may also include at least one transceiver. The at least one transceiver may receive outgoing baseband data (such as web data, e-mail, interactive video game data, or the like) from the controller 420. A transmission processing circuit may encode, multiplex, and digitize the outgoing baseband data to generate a processed baseband or intermediate-frequency signal. The communication unit 410 may up-convert the outgoing baseband or intermediate-frequency signal processed through the transmission processing circuit into an RF signal to be transmitted through an antenna. The communication unit 410 may communicate with the control device 102 through wireless or wired communication. The wireless communication may be based on one of cellular communication, WiFi, and Bluetooth. The communication unit 410 may receive, from the control device 102, at least one piece of information on the position of the control device 102 and information indicating whether or not the control device 102 is close to the ground.

The controller 420 may control the communication unit 410, the origin-signal generator 430, and the display 440, which are functionally associated with the controller 420. For example, the controller 420 may control the reception of a forward channel signal and the transmission of a reverse channel signal using the communication unit 410. In some embodiments, the controller 420 may include at least one microprocessor or microcontroller. The controller 420 may execute other processes or programs provided in the electronic device 101. The controller 420 may store or retrieve data in or from the electronic device 210, which is required for the execution process. In some embodiments, the controller 420 may be configured to execute an application in response to a received signal on the basis of an operating system.

The origin-signal generator 430 may broadcast one or more origin signals for measuring the coordinates of the control device 102 in FIG. 1. For example, the origin signal may be in the form of a magnetic field. In this case, the origin-signal generator 430 may generate magnetic field signals by passing a current through a three-axis coil. That is, the origin-signal generator 430 may generate the magnetic field for a specific alternating current frequency in three axes. As the origin-signal generator 430 generates the magnetic field, the position of the electronic device 101, which will be described later in FIG. 10, may be a reference point of the position of the control device 102.

The display 440 may be a liquid crystal display, a light-emitting diode display, or other displays capable of displaying text and/or images. The display 440 may display, on the display, an object corresponding to the data received through the controller 420. The display 440 may display, on the display, an object corresponding to the data received from the control device 102. For example, the object may include a shape of the control device 102, a shape of a hand of a user of the control device 102, a pointer object, and a UI for indicating information input by the user.

Although FIG. 4 shows that the electronic device 101 includes the communication unit 410, the controller 420, the origin-signal generator 430, and the display 440, this is only an example. The electronic device 101 may further include other elements, or may exclude some of the controller 420, the origin-signal generator 430, and the display 440 described above.

Figure 5:
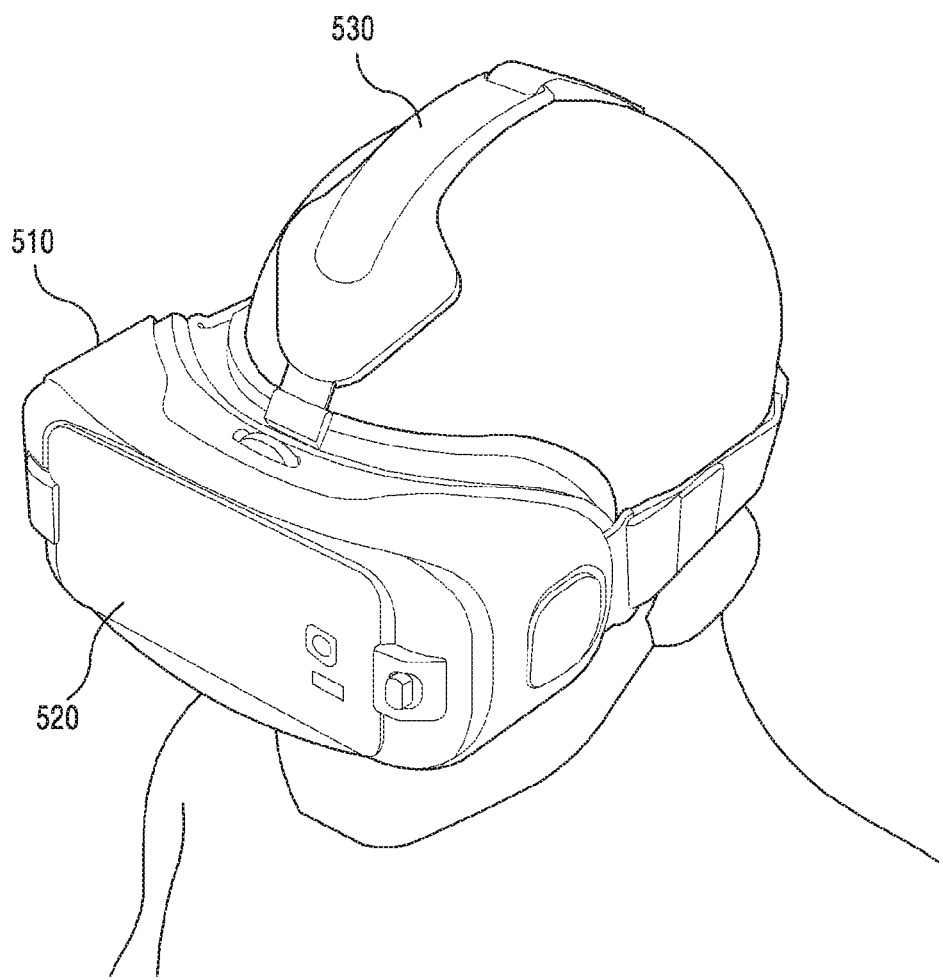
FIG. 5 illustrates an example of an electronic device according to various embodiments of the disclosure.

FIG. 5 illustrates an example of an electronic device 101 according to various embodiments of the disclosure.

Referring to FIG. 5, the electronic device 101 according to various embodiments may be obtained by a combination of a wearable device 510 and a user device 520. The wearable device 510 may be mounted on the user's head, and the user device 520 may be physically attached to the wearable device 510, and may have a display. In some embodiments, the user device 520 may be configured to be attached to and detached from the wearable device 510. In addition, the wearable device 510 may include a space or a structure capable of accommodating the user device 520. The wearable device 510 may include a fastening unit 530 (e.g., a band, eyeglasses temples, a helmet, a strap, or the like) for fastening the wearable device 510 to the user's head, and may selectively include a user interface (UI) (not shown). In some embodiments, the fastening unit 530 may be a band of an elastic material, and may function to bring the wearable device 510 into tight contact with a user's face around the eyes thereof.

The wearable device 510 may include a touch panel (not shown) as a UI on the outer surface thereof. The touch panel may include at least one display position adjustment unit and/or a lens adjustment unit. In some embodiments, the touch panel may directly receive a touch input or hovering input from the user. If the wearable device 510 and the user device 520 are combined by using an interface, such as a USB, the touch input received by the touch panel may be transmitted to the user device 520. Accordingly, the user device 520 may perform a function corresponding to the touch input received from the touch panel. For example, the user device 520 may adjust the volume or control the playback of an image in response to the received touch input. The wearable device 510 may include a control device (not shown) to control the user device 520. For example, the control device may include at least one of physical keys, physical buttons, touch keys, a joystick, a wheel key, and a touch pad. The touch pad may display a graphical user interface for controlling the user device 520.

The wearable device 510 and the user device 520 may perform communications for data exchange. For example, the wearable device 510 and the user device 520 may perform communications through a wired line by means of a physical connection (for example, a cable) or through a wireless channel. As another example, the wearable device 510 may further include a connector, which is connected to an electrical connection of the user device 520 to enable communication with the user device 520, and may provide the display with a UI signal through the connection between the connector and the electrical connection. In some embodiments, a lens assembly may be provided between the display and the user's eyes. The data transferred from the wearable device 510 to the user device 520 may include information about a user input detected through an input interface (e.g., a touchpad, buttons, and the like) of the wearable device 510. In addition, the data transferred from the user device 520 to the wearable device 510 may include information about movement of the control device 102, which will be shown in FIG. 7 below.

The wearable device 510 or the user device 520 may include one or more sensors (not shown) in order to display a pointer object corresponding to the movement of the control device 102. For example, the one or more sensors may include an accelerometer and a GPS receiver for acquiring information related to the movement of the control device or one or more sensors for detecting other motions.

In the embodiment described with reference to FIG. 5, a pointer object may be displayed through a display of the user device 520. However, according to another embodiment, the wearable device 510 may include a display (not shown) separate from the display of the user device. In this case, the pointer object may be displayed through the display of the wearable device 510. To this end, the wearable device 510 may include an independent computing device.

In the embodiment described with reference to FIG. 5, the electronic device 101 may be a combination of the wearable device 510 and the user device 520. However, according to another embodiment, the wearable device 510 may include all elements necessary for display of the pointer object, as well as the display. In this case, the electronic device 101 may be configured as only the wearable device 510. In this case, the wearable device 510 may be referred to as an "HMD". In addition, according to another embodiment, the user device 520 may include all elements necessary for display of the pointer object. In this case, the wearable device 510 may be an auxiliary device only for wear, and the electronic device 101 may be configured as only the user device 520. Thus, in various embodiments described below, the electronic device 101 may denote a combination of the wearable device 510 and the user device 520, or may denote one of either the wearable device 510 or the user device 520.

Figure 6:
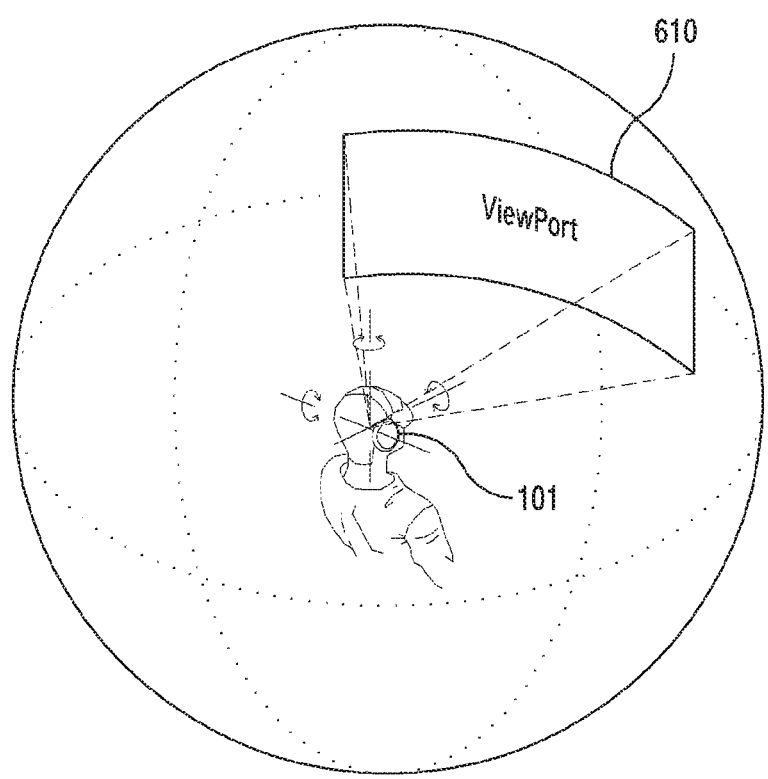
FIG. 6 illustrates an example of a viewport formed by an electronic device according to various embodiments of the disclosure.

FIG. 6 illustrates an example of a viewport formed by an electronic device 101 according to various embodiments of the disclosure.

Referring to FIG. 6, the electronic device 101 may form a viewport 610 in a real or virtual environment, and may output real external objects, virtual objects, or data information through the viewport 610. The viewport 610 may refer to an area for displaying content. For example, the viewport 610 may refer to a whole area or a portion of the display of the electronic device 101. In addition, the viewport 610 may refer to an area in which the pointer object is movable. The shape of the viewport 610 may be a rectangle as shown in FIG. 6, but it is not limited thereto, and it may have any of various shapes such as a circle, a sphere, and an irregular shape. The viewport 610 may be referred to as another name, such as "display area", "display space", or the like, depending on its technical meaning.

The electronic device 101 may provide at least one of a see-through function for providing augmented reality (AR) through the viewport 610 or a see-closed function for providing a virtual reality (VR). The see-through function may refer to a function of visually providing actual external objects and/or virtual objects while transmitting actual external objects to the user's eyes through a display or transparent/translucent lenses of the electronic device 101. That is, the electronic device 101 may provide the user with additional information and/or images of actual external objects through the viewport 610 using the see-through function. In some embodiments, the electronic device 101 may use a hologram, instead of using the display or lenses, to provide the user with additional information of actual external objects. The see-closed function may be a function of visually providing content (e.g., games, movies, streaming, broadcast, and the like) provided through the viewport 610 by arranging the display of the electronic device 101 in front of the user's eyes. The electronic device 101 may output an independent screen on the display to immerse the user thereinto. That is, the electronic device 101 may provide images displayed on the display, avoiding direct transfer of images of the actual external objects to the user's eyes.

Figure 7:
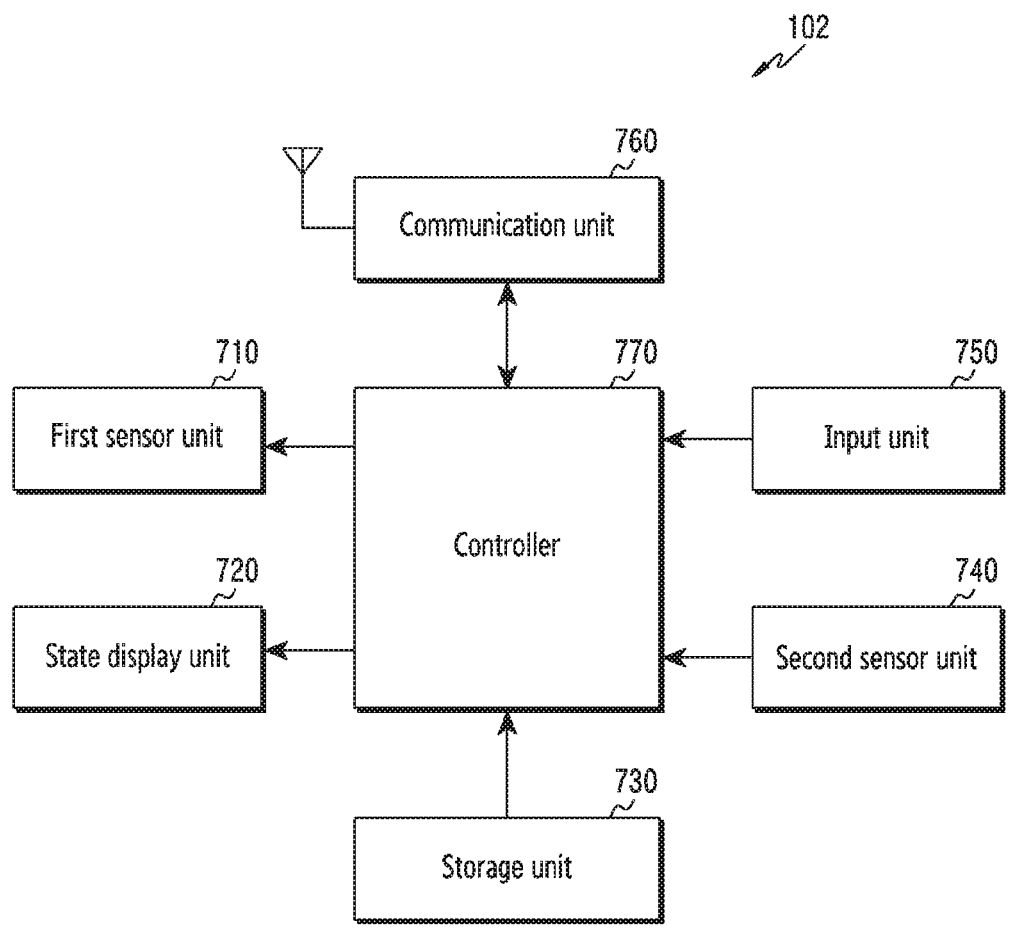
FIG. 7 illustrates an example of a functional configuration of a control device according to various embodiments of the disclosure.

FIG. 7 illustrates an example of a functional configuration of a control device 102 according to various embodiments of the disclosure.

Referring to FIG. 7, the control device 102 may include a first sensor unit 710, a state display unit 720, a storage unit 730, a second sensor unit 740, an input unit 750, a communication unit 760, and a controller 770.

The first sensor unit 710 may measure physical quantities, or may detect the operating state of the control device 102, thereby converting the measured or detected information into electrical signals. The first sensor unit 710 may include at least one of, for example, a gesture sensor, a gyro sensor, a geomagnetic sensor, an atmospheric pressure sensor, a magnetic sensor, an acceleration sensor, a grip sensor, a proximity sensor, a biometric sensor, a UV sensor, and a magnetic field sensor. In some embodiments, the first sensor unit 710 may detect gestures of user's hands or fingers using at least one of the acceleration sensor, the gyro sensor, the geomagnetic sensor, the magnetic sensor, and the gesture sensor. In addition, the first sensor unit 710 may detect whether or not the user is wearing the control device 102 using at least one of the proximity sensor and the grip sensor. The first sensor unit 710 may recognize biometric information of the user using a biometric sensor such as an EMG sensor. The first sensor unit 710 may include a control circuit for controlling at least one sensor. The first sensor unit 710 may measure the intensity of a current generated by a magnetic field, which is generated from the electronic device 101 and is induced to a three-axis coil of a magnetic field sensor, using the magnetic field sensor. The magnetic field sensor may include at least one of a three-axis coil, an amplifier, an analog-to-digital converter (ADC), and a band pass filter.

The state display unit 720 may be a liquid crystal display, a light-emitting diode display, or other displays capable of displaying the state of the control device 102. In some embodiments, the state display unit 720 may display the battery state and power-on/off state of the control device 102, the connection state of the control device 102 with the electronic device 101, and the like. In addition, the state display unit 720 may display a screen corresponding to the data received through the controller 770. In some embodiments, the state display unit 720 may be omitted.

The storage unit 730 may be coupled to the controller 770. A part of the storage unit 730 may include random access memory (RAM), and another part of the storage unit 730 may include flash memory or other read-only memory (ROM).

The second sensor unit 740 may determine the distance between the control device 102 and the ground to thus convert the information about the determined distance into an electrical signal. The second sensor unit 740 may include at least one of a proximity sensor, an IR sensor, a pressure sensor, and an ultrasonic sensor. The "ground" used therein is not limited to the ground, and may encompass any of various points or sides from which the distance to the control device 102 may be measured. For example, the ground may include a desk, a lap, and a wall. In some embodiments, the ground may include various points or sides that come into contact with the control device 102.

The input unit 750 may include a touchpad, an analog stick, and buttons. The touch pad may recognize a touch input by at least one of an electrostatic type, a pressure-sensitive type, an infrared type, and an ultrasonic type. In the electrostatic type of touch pad, the input unit 750 may recognize physical contact with the control device 102 or proximity thereto. In addition, the touch pad may include a tactile layer. The touchpad including a tactile layer may provide a tactile response to the user. The buttons may include physical buttons, optical keys, or a keypad. In addition, the touch pad may include a control circuit for controlling a touch input. In some embodiments, the input unit 750 may be omitted.

The communication unit 760 may receive RF signals. To this end, the communication unit 760 may include one or more antennas. The communication unit 760 may down-convert the received signal in order to generate an IF or baseband signal. The communication unit 760 may include a reception processing circuit that filters, decodes, and/or digitizes a baseband signal or IF signal, thereby generating a processed baseband signal. The reception processing circuit may transmit the processed baseband signal to a speaker for voice data, or may transmit the same to the controller 770 for further processing (e.g., web browsing data). The communication unit 760 may also include at least one transceiver. The at least one transceiver may receive outgoing baseband data (such as web data, e-mail, interactive video game data, or the like) from the controller 770. A transmission processing circuit may encode, multiplex, and digitize the outgoing baseband data to generate a processed baseband or intermediate-frequency signal. The communication unit 760 may up-convert the outgoing baseband or intermediate-frequency signal processed through the transmission processing circuit into an RF signal to be transmitted through an antenna. The communication unit 760 may communicate with the electronic device 101 through wireless or wired communication. The wireless communication may be based on one of cellular communication, WiFi, and Bluetooth. The communication unit 760 may transmit, to the electronic device 101, information on the position of the control device 102 determined by the controller 770. The information on the position of the control device 102 may be determined on the basis of the three-dimensional magnetic field received from the electronic device 101 and the intensity of current measured by the first sensor unit 710.

The controller 770 may control a state display unit 720, a storage unit 730, a second sensor unit 740, an input unit 750, and a communication unit 760, which are functionally associated with the controller 770. For example, the controller 770 may control the reception of a forward channel signal and the transmission of a reverse channel signal using the communication unit 760. In some embodiments, the controller 770 may include at least one microprocessor or microcontroller. The controller 770 may execute other processes or programs provided in the control device 102. The controller 770 may store or retrieve data in or from the control device 102, which is required for the execution process. In some embodiments, the controller 770 may be configured to execute an application in response to a received signal on the basis of an operating system. The controller 770 may determine a relative position of the control device 102 using the intensity of current measured by the first sensor unit 710, thereby determining the movement of the control device 102. More specifically, the controller 770 may obtain a magnetic vector using the origin of the three-axis magnetic field (i.e., a reference point) generated in the electronic device 101 and information measured by the first sensor unit 710 (e.g., the intensity of current, the intensity of voltage, and the phase of a magnetic field signal), and may determine the coordinates of the control device 102 by means of a magnetic field formula.

In some embodiments, the coordinates of the control device 102 may be determined by the operation in which the electronic device 101 photographs the control device 102 using the camera module 291 included in the electronic device 101. For example, the electronic device 101 may analyze the photographed image of the control device 102 to identify the control device 102, and may then determine the distance between the electronic device 101 and the control device 102. In addition, the electronic device 101 may determine the relative direction in which the control device 102 is positioned with respect to the electronic device 101. The electronic device 101 may determine the coordinates of the control device 102 on the basis of the distance between the electronic device 101 and the control device 102 and the relative direction in which the control device 102 is positioned.

Although FIG. 7 illustrates the first sensor unit 710, the state display unit 720, the storage unit 730, the second sensor unit 740, the input part 750, the communication unit 760, and the controller 770, this is only an example. The control device 102 may further include other elements, and some of the first sensor unit 710, the state display unit 720, the storage unit 730, the second sensor unit 740, the input part 750, the communication unit 760, and the controller 770 described above may be omitted.

Figure 8A:
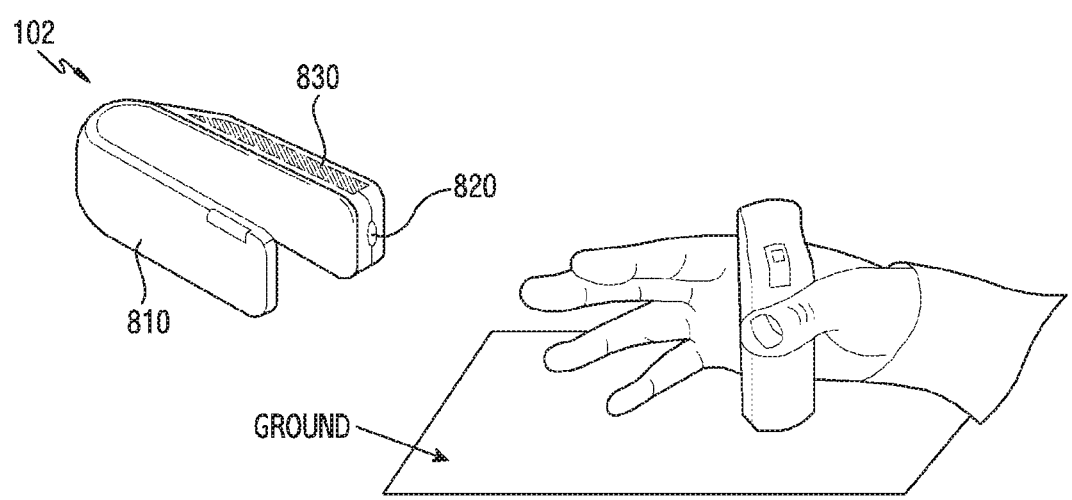
FIGS. 8A and 8B illustrate examples of a control device according to various embodiments of the disclosure.
Figure 8B:
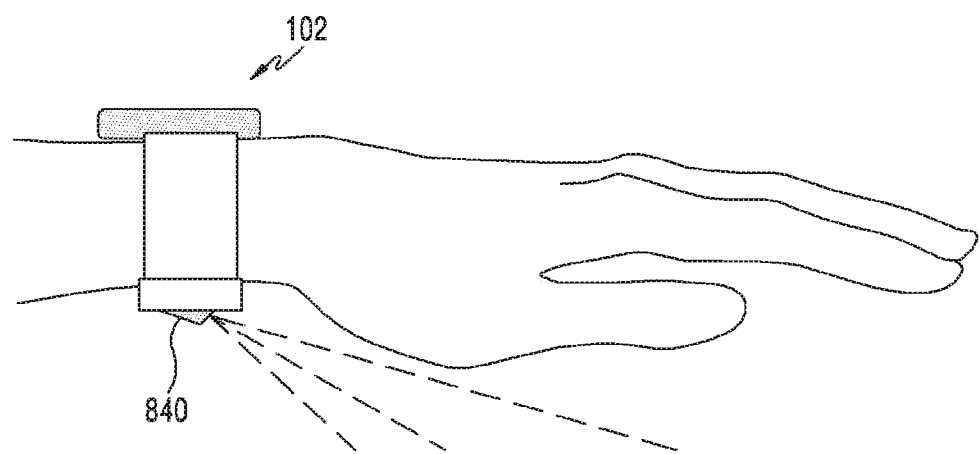

FIGS. 8A and 8B illustrate examples of a control device 102 operating according to the distance to the ground according to various embodiments of the disclosure.

Referring to FIG. 8A, the control device 102 may include a first sensor unit 810, a second sensor unit 820, and a third sensor unit 830. The first sensor unit 810 and the third sensor unit 830 may be provided inside the control device 102.

The first sensor unit 810 may detect movement of the control device 102. For example, if the control device 102 moves, the first sensor unit 810 may detect a change in the acceleration according to the movement of the control device 102, thereby detecting the movement of the control device 102. As another example, the first sensor unit 810 may detect the movement of the control device 102 using a magnetic field received from the electronic device 101. More specifically, the first sensor unit 810 may determine the position of the electronic device 101 to be a reference point using the magnetic field received from the electronic device 101. The first sensor unit 810 may detect the relative movement of the control device 102 on the basis of the reference point, and may determine coordinates for the position of the control device 102. The first sensor unit 810 may determine three-dimensional direction coordinates of the control device 102 using the magnetic field received from the electronic device 101 or using an acceleration sensor, a gyro sensor, and a geomagnetic sensor. The first sensor unit 810 may determine the posture of the control device 102, such as rotation or tilt, using the three-dimensional direction coordinates.

The second sensor unit 820 may detect the distance between the control device 102 and the ground. In some embodiments, if one side of a housing of the control device 102 approaches the ground within a predetermined distance therefrom, the second sensor unit 820 may detect that one side of the housing of the control device 102 is getting close to the ground within a predetermined distance therefrom. In other embodiments, if one side of the housing of the control device 102 comes into contact with the ground, the second sensor unit 820 may detect that one side of the housing of the control device 102 comes into contact with the ground. For example, if the light output from a light-emitting unit (not shown) included in the second sensor unit 820 is reflected on the ground and is then input to a light-receiving unit (not shown), the second sensor unit 820 may calculate the time from when the light is output from the light-emitting unit to when the light is input to the light-receiving unit, thereby detecting whether the control device 102 is getting close to the ground within a predetermined distance therefrom. In this case, since the control device 102 is aware of the speed of light, the control device 102 may multiply the time from when the light is output from the light-emitting unit to when the light is input to the light-receiving unit by the speed of light, thereby determining the distance between the control device 102 and the ground. As another example, the second sensor unit 820 may determine the distance between the control device 102 and the ground using an ultrasonic sensor or a pressure sensor, which are included in the second sensor unit 820.

The second sensor unit 820 may detect the movement of the control device 102. For example, if the light output from a light-emitting unit included in the second sensor unit 820 is reflected on the ground and is then input to a light-receiving unit, the second sensor unit 820 may detect the movement of the control device 102 using a pattern value of light that changes depending on the state of the ground (e.g., the unevenness or material of the ground). As another example, the second sensor unit 820 may detect the movement of the control device 102 using the amount of reflected light that varies depending on the state of the ground.

The third sensor unit 830 may detect finger gestures of the user. For example, if the second sensor unit 820 detects that the control device 102 approached the ground within a predetermined distance therefrom, the third sensor unit 830 may detect that the user taps on the ground once with an index finger, or may detect that the user swipes down on the ground with an index finger and a middle finger. In some embodiments, the third sensor unit 830 may not perform the function of detecting the finger gestures of the user.

As shown in FIG. 8A, the control device 102 may be in the form of a curved "n" letter so as to be controlled by holding the same in a hand. In this case, the user may control an input unit (not shown) using fingers while holding the control device 102 in a user's hand. However, the control device 102 is not limited to a specific form, and may have any of various forms. For example, the control device may be in the form of a wristband or a wristwatch worn on the wrist as shown in FIG. 8B. The wristband may be formed of an elastic material, and may include a sensor 840 for measuring the distance to the ground. If the control device 102 is in the form of a wristband, the control device 102 may be fixed to the wrist so that the user may easily move his/her hands and fingers.

Figure 9:
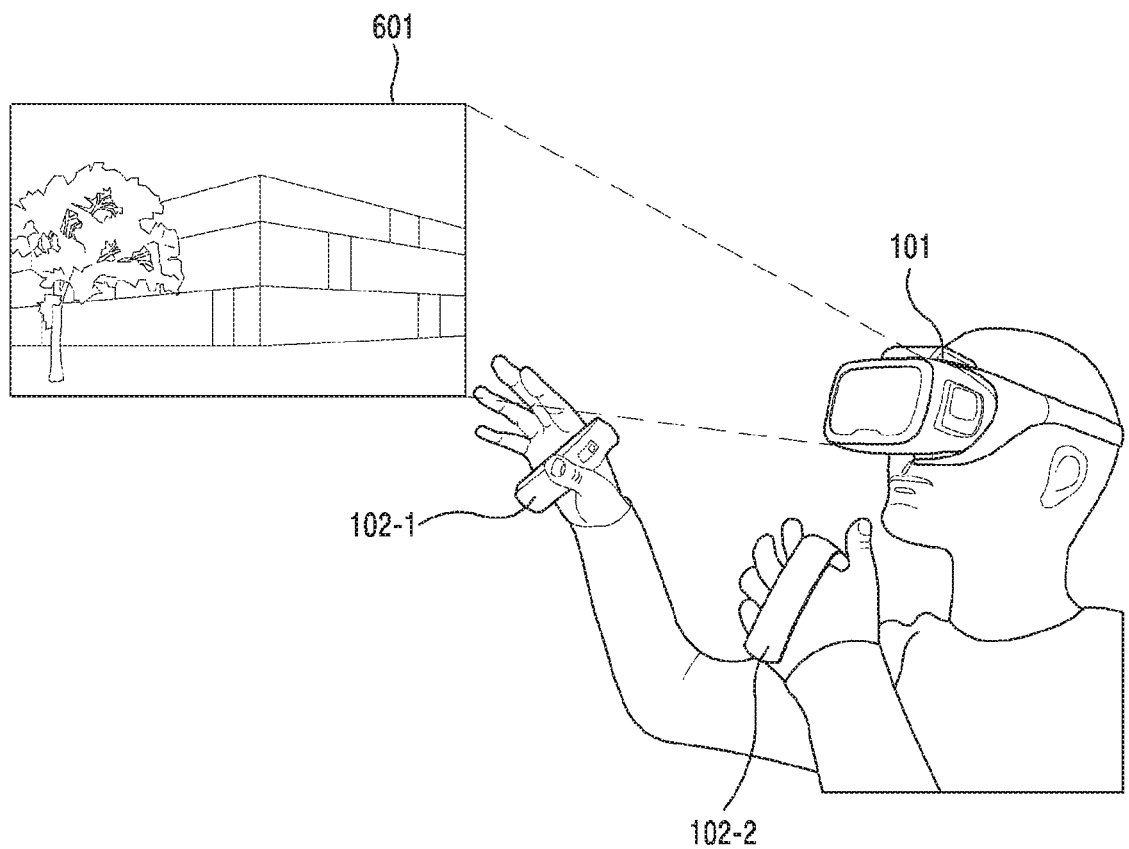
FIG. 9 illustrates an example of the operation of a control device for controlling content displayed in an electronic device according to various embodiments of the disclosure.

FIG. 9 illustrates an example of the operation of first and second control devices 102-1 and 102-2 for controlling content displayed in an electronic device 101 according to various embodiments of the disclosure.

Referring to FIG. 9, the electronic device 101 may display content through a viewport 601. In some embodiments, the electronic device 101 may display content through the viewport 601 using a user device 520 (not shown) included in the electronic device 101. The content may include two-dimensional content, such as images and videos, or three-dimensional content such as virtual reality.

The first and second control devices 102-1 and 102-2 may control the content displayed in the electronic device 101. More specifically, the first and second control devices 102-1 and 102-2 may transmit input information about the content to the electronic device 101, thereby controlling the content. The input information transmitted from the first and second control devices 102-1 and 102-2 to the electronic device 101 may include information about user inputs detected through input interfaces of the first and second control devices 102-1 and 102-2. For example, if the input interfaces are first sensor units 710 of the first and second control devices 102-1 and 102-2, the first and second control devices 102-1 and 102-2 may transmit at least one piece of information about the distances between the first and second control devices 102-1 and 102-2 and the ground, information about the movement of the first and second control devices 102-1 and 102-2, and information about finger gestures of the user. As another example, if the input interfaces are input units 750 (e.g., touchpads or buttons) of the first and second control devices 102-1 and 102-2, the control devices 102-1 and 102-2 may transmit information about physical user inputs with respect to the input units of the first and second control devices 102-1 and 102-2.

The input information of the electronic device 101 may include a variety of input information, as well as the input information received from the first and second control devices 102-1 and 102-2. Various kinds of inputs to the electronic device 101 will be described with reference to FIG. 11 later.

Figure 10:
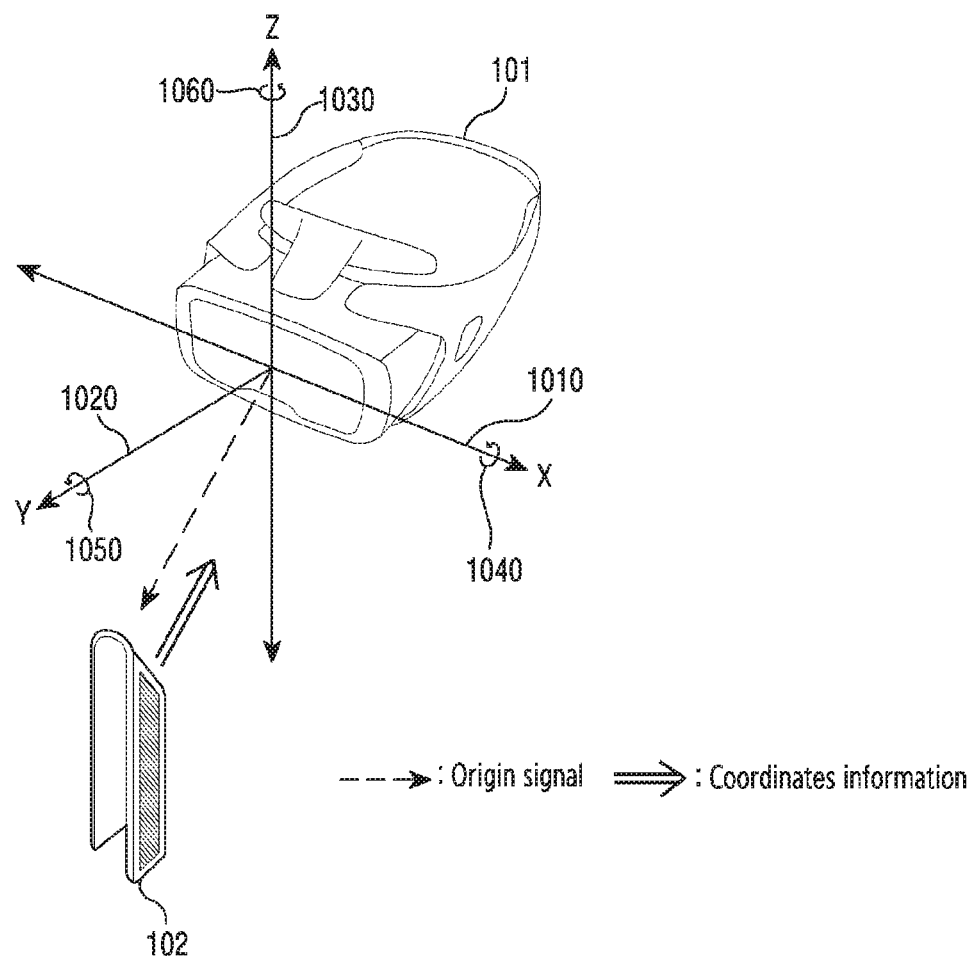
FIG. 10 illustrates the interaction between an electronic device and a control device according to various embodiments of the disclosure.

FIG. 10 illustrates the interaction between an electronic device 101 and a control device 102 according to various embodiments of the disclosure.

Referring to FIG. 10, the electronic device 101 may transmit an origin signal to the control device 102. The control device 102 may determine the position of the control device 102 on the basis of the origin signal received from the electronic device 101. More specifically, the control device 102 may determine the position of the control device 102 as three-dimensional coordinates on three-dimensional coordinate axes on the basis of the origin signal. The origin signal may be a magnetic field signal transmitted to determine the position of the control device 102. In some embodiments, the control device 102 may determine three-dimensional coordinates and three-dimensional direction coordinates, which indicate the position of the control device 102, on the basis of the origin signal. In other embodiments, if the control device 102 is close to the ground, the control device 102 may determine the position of the control device 102 using two-dimensional coordinates on two-dimensional coordinate axes on the basis of the origin signal. Coordinate axes used herein may refer to reference directions for indicating the position of an object. The coordinate axes may be referred to as another name, such as "axes", "directions", or "coordinate directions" depending on their technical meanings. For example, three-dimensional coordinate axes for determining the position of the control device 102 may include an X-axis 1010, a Y-axis 1020, and a Z-axis 1030. The X-axis 1010 may be an axis in the left and right directions of the electronic device 101 with respect to the front surface of the electronic device 101. The Y-axis 1020 may be an axis in the forward and backward directions of the electronic device 101 with respect to the front surface of the electronic device 101. That is, the Y-axis 1020 may be perpendicular to the front surface of the electronic device 101. The Z-axis 1030 may be an axis in the upward and downward directions of the electronic device 101 with respect to the front surface of the electronic device. In this case, the X-axis 1010, the Y-axis 1020, and the Z-axis 1030 are perpendicular to each other, and the position of the electronic device 101 may be the origin (e.g., (0,0,0)). As another example, the three-dimensional direction coordinates for determining the direction of the control device 102 may include a roll angle 1040, which is a rotation angle about the X-axis 1010, a pitch angle 1050, which is a rotation angle about the Y-axis 1020, and a yaw angle 1060, which is a rotation angle about the Z-axis 1030.

The control device 102 may transmit information about the three-dimensional coordinates to the electronic device 101. More specifically, the control device 102 may transmit, to the electronic device 101, at least one piece of information indicating the position of the control device 102 and information indicating whether or not the control device 102 is close to the ground. In some embodiments, the control device 102 may further transmit, to the electronic device 101, the number of coordinate values indicating the position of the control device 102.

In some embodiments, if the electronic device 101 is directed in the Y-axis 1020 direction, and if the control device 102 comes into contact with the ground, the control device 102 may transmit information about two-dimensional coordinates to electronic device 101. In this case, the Z-axis coordinate of the control device 102 is not changed, and only the X-axis coordinate and Y-axis coordinate may be changed. In other embodiments, if the electronic device 101 is tilted, the Z-axis 103 of the electronic device 101 is tilted as well. Thus, even if the control device 102 is in contact with the ground, the Z-axis coordinate may change according to the movement of the device 102. Accordingly, the control device 102 may convert three-dimensional coordinate values to two-dimensional coordinate values, and may transmit the two-dimensional coordinate values to the electronic device 101.

Figure 11:
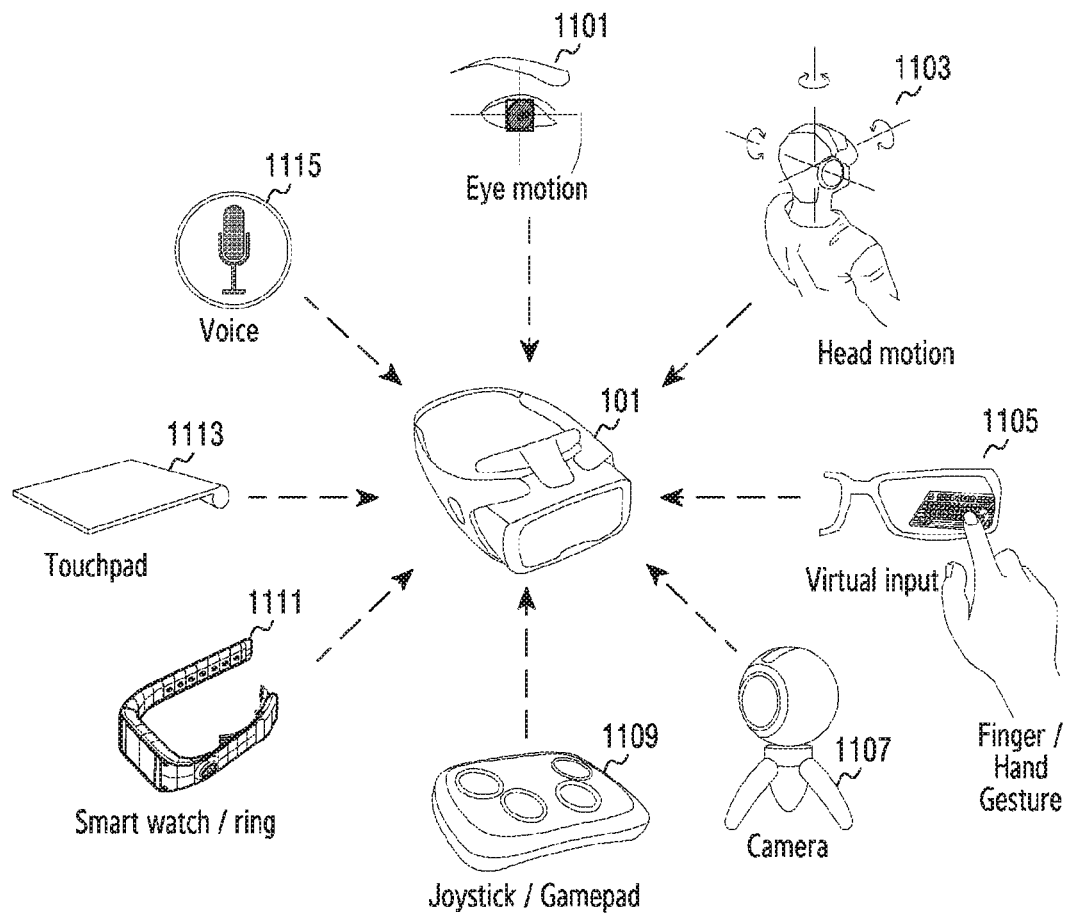
FIG. 11 illustrates an example of various inputs to an electronic device according to various embodiments of the disclosure.

FIG. 11 illustrates an example of various inputs to an electronic device 201 according to various embodiments of the disclosure.

Referring to FIGS. 11 and 2, the electronic device 201 may receive input information through the elements of the electronic device 201, or may receive input information from an external device that is electrically coupled to the electronic device 201.

The electronic device 201 may receive input information about an eye motion 1101 of the user using the gaze tracker 299. The gaze tracker 299 may detect the eye motion 1101 of the user using a light-emitting unit for emitting light and a light-receiving unit for receiving light reflected by the user's eyes, which are included in the electronic device 201. That is, the gaze tracker 299 may detect the motion of the pupil through the analysis of the image taken in real time by a camera, and may track the user's gaze by calculating the direction of a gaze on the basis of a fixed position reflected on the cornea.

The electronic device 201 may receive an input of a head motion 1103 of the user wearing the electronic device 101 using at least one of the gyro sensor 240B, the acceleration sensor 240E, and the geomagnetic sensor 240N. For example, the electronic device 201 may detect acceleration in the X-axis, Y-axis, and Z-axis directions through the acceleration sensor 240E, and may detect an angular velocity through the gyro sensor 240B, thereby detecting the head motion 1103 of the user as a received input. That is, the electronic device 201 may detect the forward, backward, left, right, or rotational motion of the user's head, and may receive the same as an input.

The electronic device 201 may receive an input of a hand and/or finger gesture 1105 of the user through the camera module 291 or the gesture sensor 240A. In some embodiments, the electronic device 201 may receive an input of information about the hand and/or finger gesture 1105 of the user from the control device 102 electrically connected to the electronic device 201.

The electronic device 201 may be connected to other electronic devices, such as a camera 1107, a joystick/gamepad 1109, a smart watch/ring 1111, and a touch pad 1113, by wired or wireless communication, and may receive information about a user input from the other electronic devices. For example, if the user presses a button on the joystick/gamepad 1109 or touches the display of the smart watch/ring 1111, the electronic device 201 may receive information about a user input from the joystick/gamepad 1109 or the smart watch/ring 1111. As another example, the electronic device 201 may receive information about a photographed image or video from the camera 1107. The information may be transmitted to the electronic device 201 through wired (e.g., a USB) or wireless (e.g., Bluetooth or WiFi) communication.

The electronic device 201 may receive an input of information about the user's voice 1115 through the audio module 280. In some embodiments, the electronic device 201 may extract voice information from the user's voice 1115 input via a microphone of the electronic device 201 using codecs. That is, the electronic device 201 may convert the user's voice 1115 into a code that can be processed by the electronic device 201, and may recognize the same as an input.

Figure 12:
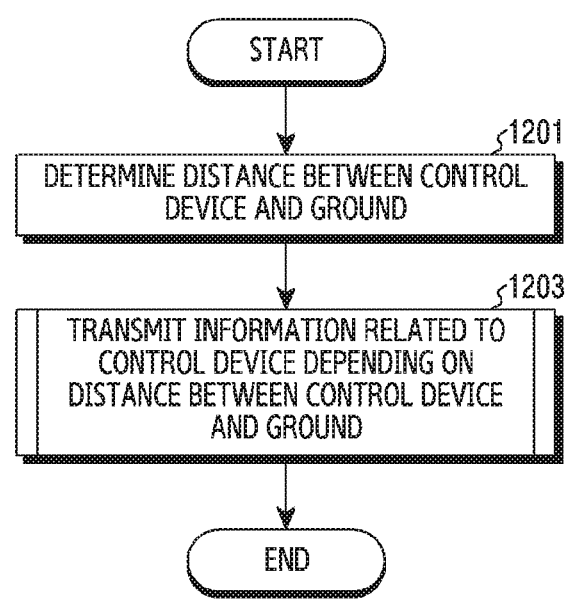
FIG. 12 illustrates a flowchart of a control device for transmitting information depending on the distance between a control device and the ground according to various embodiments of the disclosure.

FIG. 12 illustrates a flowchart of a control device 102 for transmitting information depending on the distance between a control device 102 and the ground according to various embodiments of the disclosure. FIG. 12 illustrates a method of operating the control device 102.

Referring to FIG. 12, in operation 1201, the control device 102 may determine the distance between the control device 102 and the ground. The distance to the ground may be determined using light reflected by the ground. Further, in some embodiments, the distance to the ground may be determined by an ultrasonic sensor or a pressure sensor of the control device 102. The distance to the ground determined by the control device 102 may be expressed as a physical distance value or as one of predefined levels.

In operation 1203, the control device 102 may transmit, to the electronic device 101, information related to the control device 102 depending on the distance between the control device 102 and the ground. More specifically, the control device 102 may transmit, to the electronic device 101, at least one piece of information on whether or not the distance between the control device 102 and the ground is less than a threshold value, information on the input dimension, and information on the position of the control device 102. The information on whether or not the distance is less than a threshold value and the information on the input dimension may be understood as equivalent, and may be interchangeably used with each other. The information on the position of the control device 102 may be information on two-dimensional or three-dimensional coordinates to indicate the position of the control device 102. In some embodiments, the information on the position of the control device 102 may include three-dimensional direction coordinates (e.g., the roll angle 1040, which is a rotation angle about the X-axis 1010, the pitch angle 1050, which is a rotation angle about the Y-axis 1020, and the yaw angle 1060, which is a rotation angle about the Z-axis 1030). The three-dimensional direction coordinates may be determined using the magnetic field received from the electronic device 101, or may be determined using an acceleration sensor, a gyro sensor, and a geomagnetic sensor of the control device 102. In other embodiments, the control device 102 may further transmit information about the finger gesture of the user.

In the embodiment described with reference to FIG. 12, the control device 102 may transmit information on whether or not the distance between the control device 102 and the ground is less than a threshold value or information on the input dimension. The information on whether or not the distance is less than a threshold value or the information on the input dimension may be transmitted in any of various ways. In some embodiments, the control device 102 may use at least one bit assigned to indicate whether or not the distance is less than a threshold value or the input dimension. In other embodiments, the control device 102 may transmit a parameter indicating whether or not the distance is less than a threshold value, whether or not the control device is in contact with the ground, or the input dimension. In yet other embodiments, the control device 102 may allow the electronic device 101 to estimate whether or not the distance is less than a threshold value or the input dimension through the parameter. In an embodiment, the control device 102 may represent whether or not the distance is less than a threshold value or the input dimension using the number of coordinate values constituting the information about the position. In other embodiments, the control device 102 may use a method for converting the format of data with respect to the electronic device 101. For example, the method of converting the format of data may include a method of converting three pieces of data representing three-dimensional coordinates into two pieces of data representing two-dimensional coordinates. In the following description, it may be understood that the transmission of the information on whether or not the distance is less than a threshold value or the information on the input dimension is performed according to any of the above described embodiments.

Figure 13:
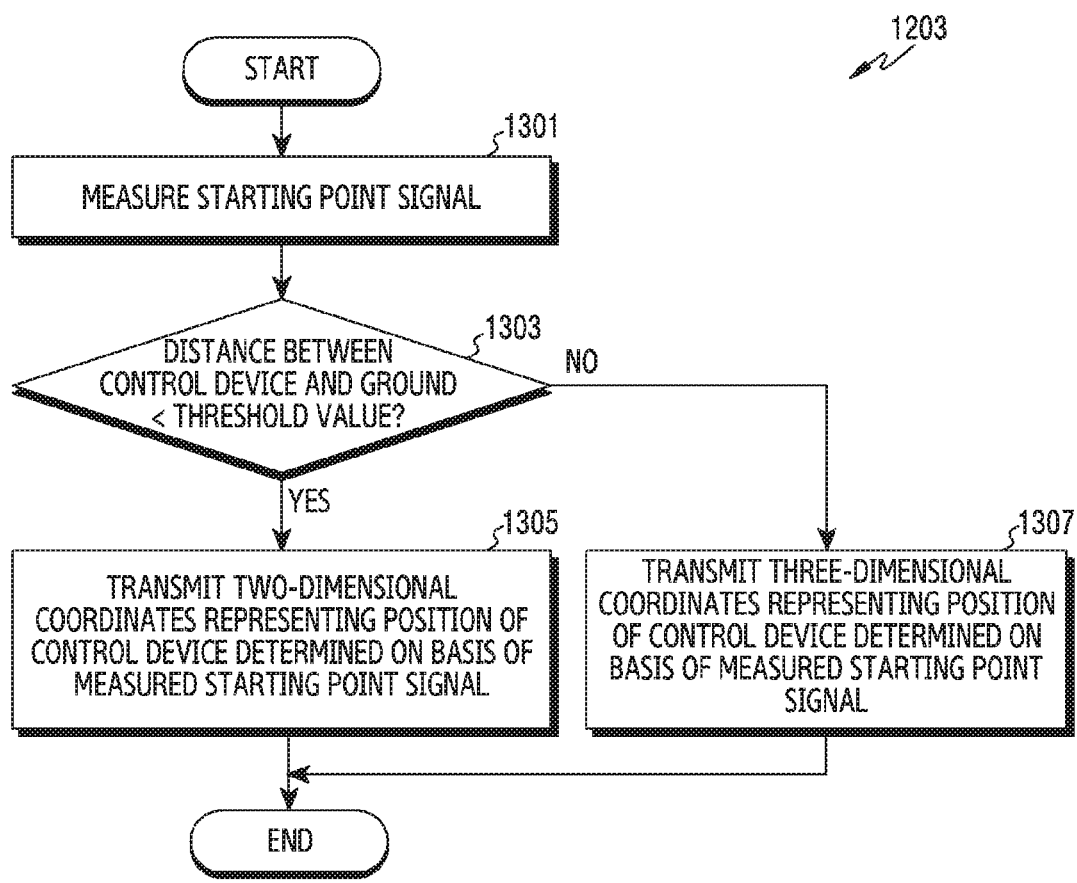
FIG. 13 illustrates a flowchart of a control device for transmitting information about two-dimensional or three-dimensional coordinates indicating the position of a control device according to various embodiments of the disclosure.

FIG. 13 illustrates a flowchart of a control device 102 for transmitting information about two-dimensional or three-dimensional coordinates indicating the position of a control device 102 according to various embodiments of the disclosure. FIG. 13 illustrates a method of operating the control device 102.

Referring to FIG. 13, the control device 102 may measure an origin signal from the electronic device 101 in operation 1301. For example, the origin signal may be induced in the three-axis coil of a sensor of the control device 102, thereby generating a current. The control device 102 may determine respective distances from the electronic device 101 with respect to the three axes depending on the intensity of the current, and may determine the relative coordinate values of the electronic device 101 using the distances.

In operation 1303, the control device 102 may determine whether or not the distance between the control device 102 and the ground is less than a threshold value upon receiving the origin signal. The threshold value may be configured by the user, or may be predetermined. If the distance between the control device 102 and the ground is less than the threshold value, the control device 102 may proceed to operation 1305. If the distance between the control device 102 and the ground is not less than the threshold value, the control device 102 may proceed to operation 1307.

In operation 1305, if the distance between the control device 102 and the ground is less than the threshold value, the control device 102 may transmit, to the electronic device 101, information about two-dimensional coordinates indicating the position of the control device 102, which are determined on the basis of the origin signal. For example, if the distance between the control device 102 and the ground is less than the threshold value, the control device 102 may transmit, to the electronic device 101, information about an X-axis coordinate and a Y-axis coordinate indicating the position of the control device 102, which are determined on the basis of the origin signal. In some embodiments, if the distance between the control device 102 and the ground is less than the threshold value, the control device 102 may transmit, to the electronic device 101, information about three-dimensional coordinates indicating the position of the control device 102, which are determined on the basis of the origin signal, and distance information indicating that the distance between the control device 102 and the ground is less than the threshold value. In this case, since the electronic device 101 may determine that the distance between the control device 102 and the ground is less than the threshold value through the distance information, the electronic device 101 may display a two-dimensional pointer object using only the two-dimensional coordinates, among the three-dimensional coordinates received from the control device 102. In other embodiments, if the distance between the control device 102 and the ground is less than the threshold value, the control device 102 may determine three-dimensional coordinates indicating the position of the control device 102 on the basis of the origin signal, and may transmit only the information about the two-dimensional coordinates to the electronic device 101.

In operation 1307, if the distance between the control device 102 and the ground is not less than the threshold value, the control device 102 may transmit, to the electronic device 101, information about three-dimensional coordinates indicating the position of the control device 102, which are determined on the basis of the origin signal. For example, if the distance between the control device 102 and the ground is not less than the threshold value, the control device 102 may transmit, to the electronic device 101, information on an X-axis coordinate, a Y-axis coordinate, and a Z-axis coordinate indicating the position of the control device 102, which are determined on the basis of the origin signal. Additionally, the control device 102 may further transmit information about roll, pitch, and yaw angles. Since the X-axis coordinate, Y-axis coordinate, and Z-axis coordinate are determined on the basis of the origin signal, the X-axis coordinate, Y-axis coordinate, and Z-axis coordinate may indicate the relative position of the control device 102 with respect to the electronic device 101. In this case, the electronic device 101 may determine that the distance between the control device 102 and the ground is not less than the threshold value by receiving only the information on the three-dimensional coordinates, instead of receiving separate information about the distance between the control device 102 and the ground. Therefore, the electronic device 101 may display a three-dimensional pointer object using the three-dimensional coordinates indicating the position of the control device 102. In some embodiments, the control device 102 may transmit, to the electronic device 101, the information on the three-dimensional coordinates indicating the position of the control device 102, which are determined on the basis of the origin signal, and the distance information indicating that the distance between the control device 102 and the ground is not less than the threshold value. In other embodiments, the control device 102 may further transmit, to the electronic device 101, the information on the three-dimensional direction coordinates for determining the direction of the control device 102. The three-dimensional direction coordinates may include a roll angle 1040, which is a rotation angle about the X-axis 1010, a pitch angle 1050, which is a rotation angle about the Y-axis 1020, and a yaw angle 1060, which is a rotation angle about the Z-axis 1030.

Figure 14:
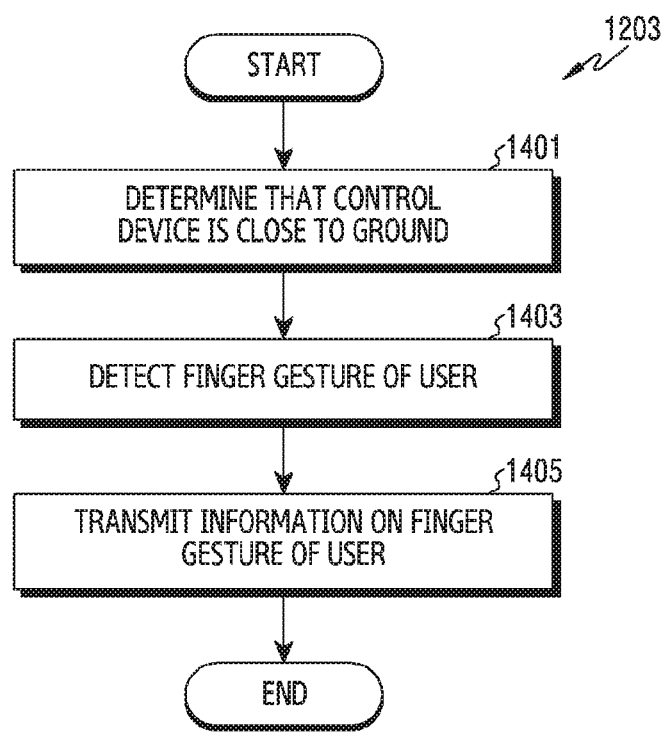
FIG. 14 illustrates a flowchart of a control device for detecting a finger gesture of a user according to various embodiments of the disclosure.

FIG. 14 illustrates a flowchart of a control device 102 for detecting the finger gesture of a user according to various embodiments of the disclosure. FIG. 14 illustrates a method of operating the control device 102.

Referring to FIG. 14, the control device 102 may determine that it is close to the ground in operation 1401. In other words, the control device 102 may determine that the distance between the control device 102 and the ground is less than a threshold value. The distance to the ground determined by the control device 102 may be expressed as a physical distance value, or may be expressed as one of predefined levels.

In operation 1403, the control device 102 may detect the finger gestures of the user. For example, if the light output from the light-emitting unit is reflected by the finger and is input to the light-receiving unit, the control device 102 may detect the finger gesture on the basis of the amount of light input to the light-receiving unit. As another example, if the control device 102 is in the form of a glove, the finger gesture may be detected using a band sensor disposed in the control device 102. As another example, if the control device 102 includes an inertial measurement unit (IMU) sensor, the finger gesture may be detected using the IMU sensor.

Figure 15:
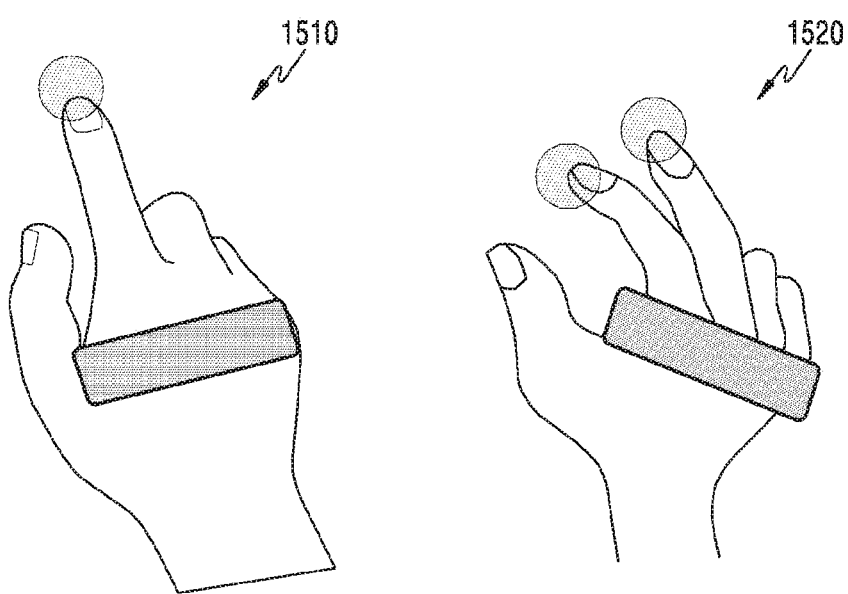
FIG. 15 illustrates an example of detecting a finger gesture of a user according to various embodiments of the disclosure.

In operation 1405, the control device 102 may transmit, to the electronic device 101, information about the finger gesture of the user. For example, as shown in FIG. 15A, if the user taps on the ground once with an index finger, the control device 102 may transmit information about a click input to the electronic device 101. As another example, if the user taps on the ground twice with an index finger, the control device 102 may transmit information about a double-click input to the electronic device 101. As another example, as shown in FIG. 15B, if the user swipes down onto the ground with an index finger and a middle finger, the control device 102 may transmit, to the electronic device 101, information on a scroll adjustment input in the screen of the electronic device 101. As another example, if the user taps on the ground with an index finger, the control device 102 may transmit, to the electronic device 101, information indicating that the function corresponding to clicking on the right button of the mouse is performed, and if the user taps on the ground with a middle finger, the control device 102 may transmit, to the electronic device 101, information indicating that the function corresponding to clicking on the left button of the mouse is performed. The control device 102 may detect a finger gesture (e.g., a gesture of moving a finger up or down or a gesture of tapping on the ground with a finger) using the third sensor unit 830, and may transmit, to the electronic device 101, information indicating that the function corresponding to clicking on the right button of the mouse is performed.

In some embodiments, even if the distance between the control device 102 and the ground is greater than or equal to the threshold value, the control device 102 may detect the finger gesture of the user. However, the same finger gesture may be processed differently between the case where the distance to the ground is greater than or equal to the threshold value and the case where the distance to the ground is less than the threshold value. For example, if the distance to the ground is greater than or equal to the threshold value, the control device 102 may detect a finger gesture, and may transmit information to allow the electronic device 101 to display the shape of the finger gesture of the user on the screen, or may transmit information for predetermined control (e.g., if the user moves an index finger, an application is executed).

As described above, the control device 102 may operate differently depending on the distance to the ground. The disclosure will now be described in terms of the operation of the electronic device 101 interacting with the control device 102.

Figure 16:
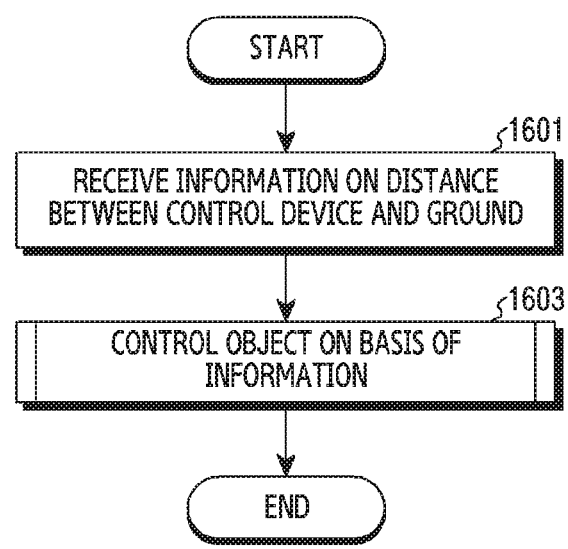
FIG. 16 illustrates a flowchart of an electronic device for controlling an object according to various embodiments of the disclosure.

FIG. 16 illustrates a flowchart of an electronic device 101 for controlling an object according to various embodiments of the disclosure. FIG. 16 illustrates a method of operating the electronic device 101.

Referring to FIG. 16, the electronic device 101 may receive, from the control device 102, information on the distance between the control device 102 and the ground in operation 1601. The distance information may be information indicating the distance itself between the control device 102 and the ground, or may be information on whether or not the distance between the control device 102 and the ground is less than a threshold value. In some embodiments, the electronic device 101 may receive, from the control device 102, distance information and position information indicating the position of the control device. The position information may indicate two-dimensional coordinates or three-dimensional coordinates of the position of the control device 102.

In operation 1603, the electronic device 101 may control the object on the basis of the distance information. More specifically, if the distance information indicates that the distance between the control device 102 and the ground is less than a threshold value, the electronic device 101 may display the object in a manner conforming to the two-dimensional input. If the distance information indicates that the distance between the control device 102 and the ground is not less than a threshold value, the electronic device 101 may display the object in a manner conforming to the three-dimensional input.

In some embodiments, the object may be a pointer object. More specifically, if the distance information indicates that the distance between the control device 102 and the ground is less than a threshold value, and if the position information indicates the two-dimensional coordinates of the control device 102, the electronic device 101 may move a two-dimensional pointer object to the position corresponding to the two-dimensional coordinates of the control device 102. If the distance information indicates that the distance between the control device 102 and the ground is not less than the threshold value, and if the position information indicates the three-dimensional coordinates of the control device 102, the electronic device 101 may move a three-dimensional pointer object to the position corresponding to the three-dimensional coordinates of the control device 102.

Figure 17:
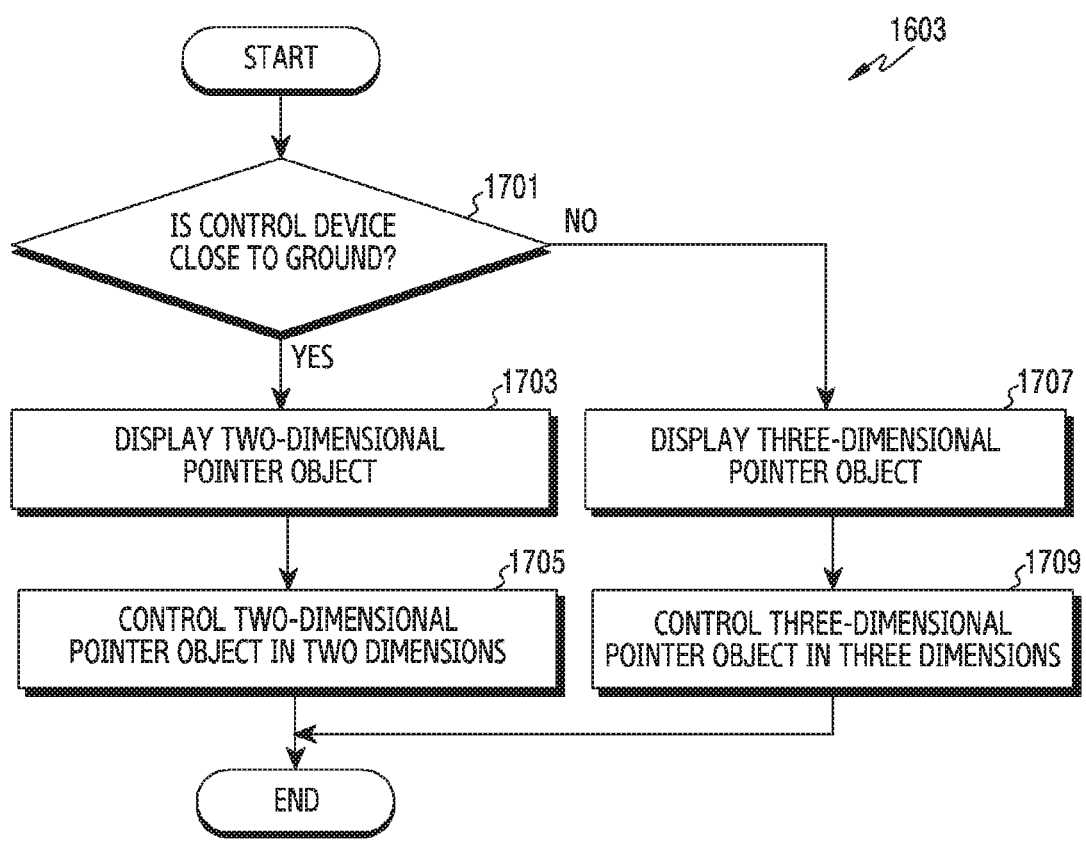
FIG. 17 illustrates a flowchart of an electronic device for controlling a pointer object according to the distance between a control device and the ground according to various embodiments of the disclosure.

FIG. 17 illustrates a flowchart of an electronic device 101 for controlling a pointer object depending on the distance between a control device 102 and the ground according to various embodiments of the disclosure. FIG. 17 illustrates a method of operating the electronic device 101.

Referring to FIG. 17, the electronic device 101 may determine whether or not the control device 120 is close to the ground in operation 1701. That is, the electronic device 101 may determine whether the distance between the control device 102 and the ground is less than a threshold value. If the distance between the control device 102 and the ground is less than the threshold value, the control device 102 proceeds to operation 1703. If the distance between the control device 102 and the ground is not less than the threshold value, the control device 102 proceeds to operation 1707.

Figure 18A:
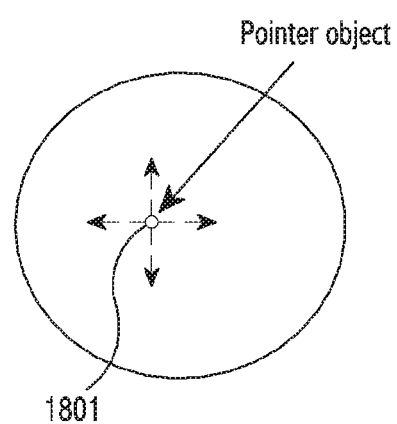
FIGS. 18A and 18B illustrate examples of a two-dimensional or three-dimensional pointer object displayed according to the distance between a control device and the ground according to various embodiments of the disclosure.

If the control device 102 is close to the ground, the electronic device 101 may display a two-dimensional pointer object in operation 1703. As shown in FIG. 18A, if the control device 102 is close to the ground, the electronic device 101 may display a two-dimensional pointer object 1801 in the two-dimensional area. In this case, if the user wears the control devices 102 on respective hands, the electronic device 101 may display two two-dimensional pointer objects corresponding to the respective control devices 102 in the two-dimensional area. The two-dimensional pointer object may be an arrow. However, the shape of the two-dimensional pointer object is not limited to the arrow, and may be any of various shapes.

Figure 19A:
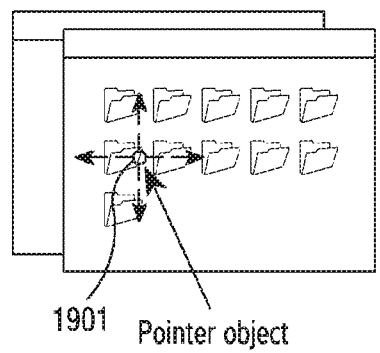
FIGS. 19A and 19B illustrate another example of a two-dimensional or three-dimensional pointer object displayed according to the distance between a control device and the ground according to various embodiments of the disclosure.

In operation 1705, the electronic device 101 may control the two-dimensional pointer object in two dimensions. In some embodiments, the electronic device 101 may move the two-dimensional pointer object using an offset of two-dimensional coordinates (i.e., the amount of change) without a depth value on the display. For example, if the control device 102 is close to the ground, as shown in FIG. 18A, the electronic device 101 may move a two-dimensional pointer object 1801, which is displayed in the two-dimensional area, up, down, left, or right, or may perform a click function. As another example, if the control device 102 is close to the ground, as shown in FIG. 19A, the electronic device 101 may move a two-dimensional pointer object 1901 up, down, left, or right in a window containing multiple folders. In this case, if the electronic device 101 receives an input signal from the control device 102, the electronic device 101 may control the pointer object 1901 so as to click or drag the folder.

Figure 18B:
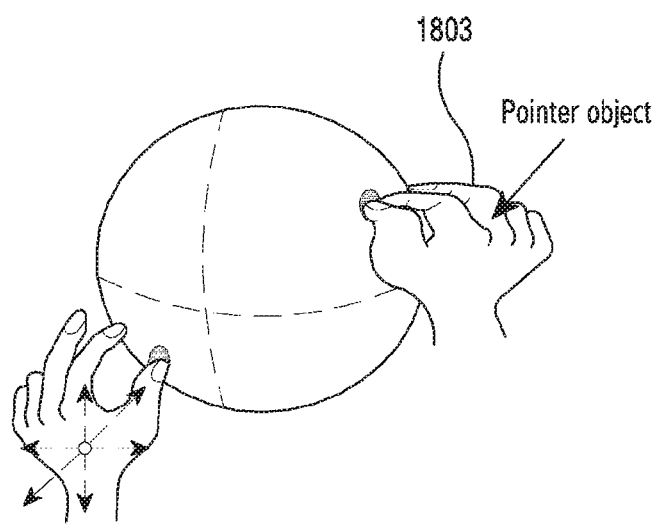

In operation 1707, if the control device 102 is not close to the ground, the electronic device 101 may display a three-dimensional pointer object. As shown in FIG. 18B, if the control device 102 stays away from the ground, the electronic device 101 may display a three-dimensional pointer object 1803 in a three-dimensional area. In this case, if the user wears the control devices 102 on the respective hands, the electronic device 101 may display two three-dimensional pointer objects corresponding to the respective control devices 102 in the three-dimensional area. If a camera of the electronic device 101 detects the hand shape of the user wearing the control devices 102, the three-dimensional pointer object may be displayed in the form of a user's hand or control device 102. However, the shape of the three-dimensional pointer object is not limited to the user's hand or the control device 102, and may be any of various forms. In some embodiments, if a finger gesture of a user is detected using an IR sensor included in the control device 102, the electronic device 101 may receive information about the finger gesture of the user from the control device 102, and may then display a three-dimensional pointer object in the form of a user's hand.

Figure 19B:
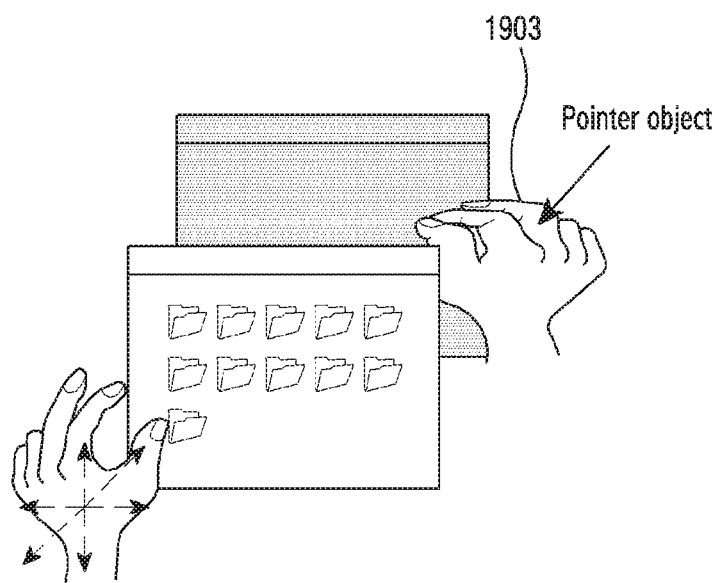

In operation 1709, the electronic device 101 may control the three-dimensional pointer object in three dimensions. In some embodiments, the electronic device 101 may move the three-dimensional pointer object using movement values of the three-dimensional coordinates including a depth value on the display. For example, if the control device 102 is close to the ground, as shown in FIG. 18A, the electronic device 101 may move the three-dimensional pointer object 1803, which is displayed in the three-dimensional area, up, down, left, right, forward, or backwards, or may perform a click function. As another example, if the control device 102 is close to the ground, as shown in FIG. 19B, the electronic device 101 may move the three-dimensional pointer object 1903 up, down, left, right, forward, or backwards. In this case, if the electronic device 101 receives an input signal from the control device 102, the electronic device 101 may control the pointer object 1903 so as to click and move one of a plurality of windows. In other embodiments, the electronic device 101 may display the hand gesture or finger gesture of the user or the motion of the control device 102. For example, the electronic device 101 may display the rotational motion of hands, fingers, or the control device 102 using the three-dimensional direction coordinates (e.g., a roll angle, a pitch angle, and a yaw angle) received from the control device 102.

Figure 20:
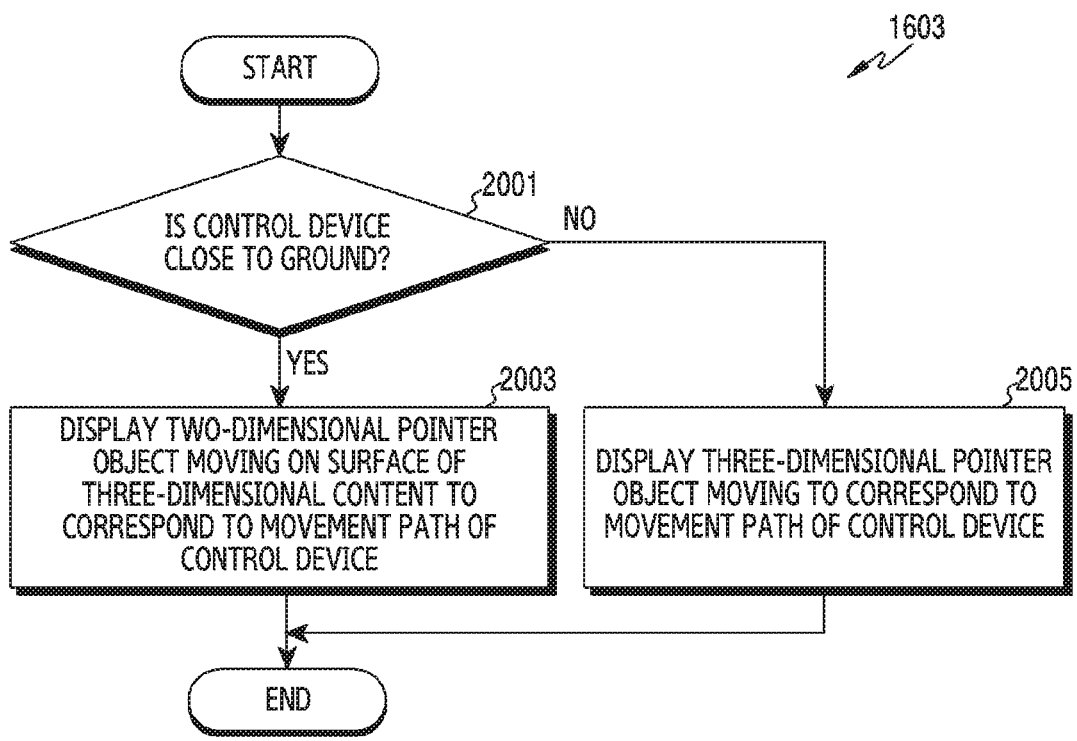
FIG. 20 illustrates a flowchart of an electronic device for displaying the movement of a two-dimensional or three-dimensional pointer object depending on the distance between a control device and the ground according to various embodiments of the disclosure.

FIG. 20 illustrates a flowchart of an electronic device 101 for displaying the movement of a two-dimensional or three-dimensional pointer object according to the distance between a control device 102 and the ground according to various embodiments of the disclosure. FIG. 20 illustrates a method of operating the electronic device 101.

Referring to FIG. 20, the electronic device 101 may determine whether or not the control device 102 is close to the ground in operation 2001. That is, the electronic device 101 may determine whether or not the distance between the control device 102 and the ground is less than a threshold value. If the distance between the control device 102 and the ground is less than the threshold value, the electronic device 101 proceeds to operation 2003. If the distance between the control device 102 and the ground is not less than the threshold value, the electronic device 101 proceeds to operation 2005.

Figure 21A:
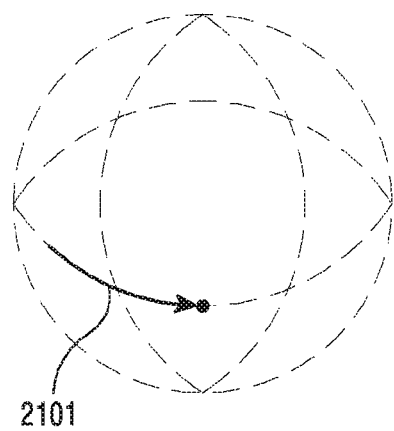
FIGS. 21A and 21B illustrate examples of the movement of a two-dimensional or three-dimensional pointer object depending on the distance between a control device and the ground according to various embodiments of the disclosure.
Figure 21A:
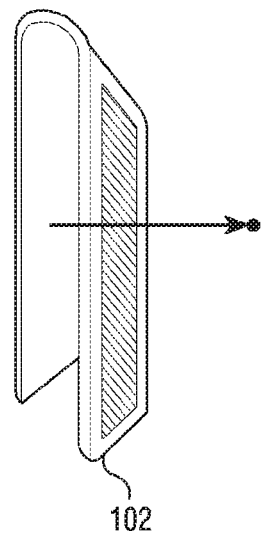

In operation 2003, if the distance between the control device 102 and the ground is less than the threshold value, the electronic device 101 may display a two-dimensional pointer object that is moving on the surface of the three-dimensional content so as to correspond to the movement path of the control device 102. For example, as shown in FIG. 21A, if the control device 102 moves from the left to the right, the electronic device 101 may display a two-dimensional pointer object that is moving along the movement path 2101 on the surface of the three-dimensional spherical content. That is, since the depth of two-dimensional pointer object on the display cannot be controlled on the basis of the movement path 2105 of the control device 102, the depth of the two-dimensional pointer object with respect to the movement path 2101 may be determined on the basis of the depth of the surface of the three-dimensional content.

Figure 21B:
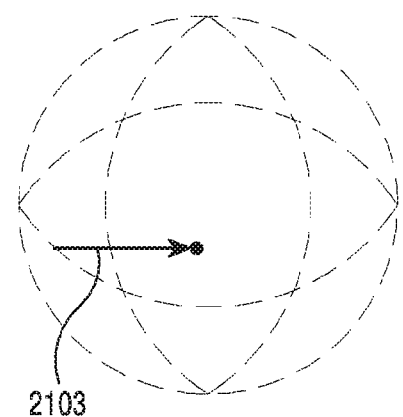
Figure 21B:
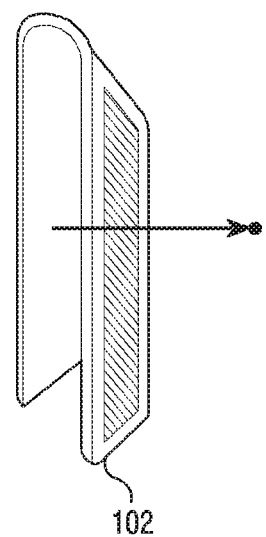

In operation 2005, if the distance between the control device 102 and the ground is not less than the threshold value, the electronic device 101 may display a three-dimensional pointer object that is moving to correspond to the movement path of the control device 102. For example, as shown in FIG. 21B, if the control device 102 moves from the left to the right, the electronic device 101 may display a three-dimensional pointer object that is moving along the same movement path 2103 as the movement path of the control device 102 on the three-dimensional spherical content. This is due to the fact that the three-dimensional pointer object may be controlled with respect to the depth on the display on the basis of the movement path 2105 of the control device 102.

Figure 22:
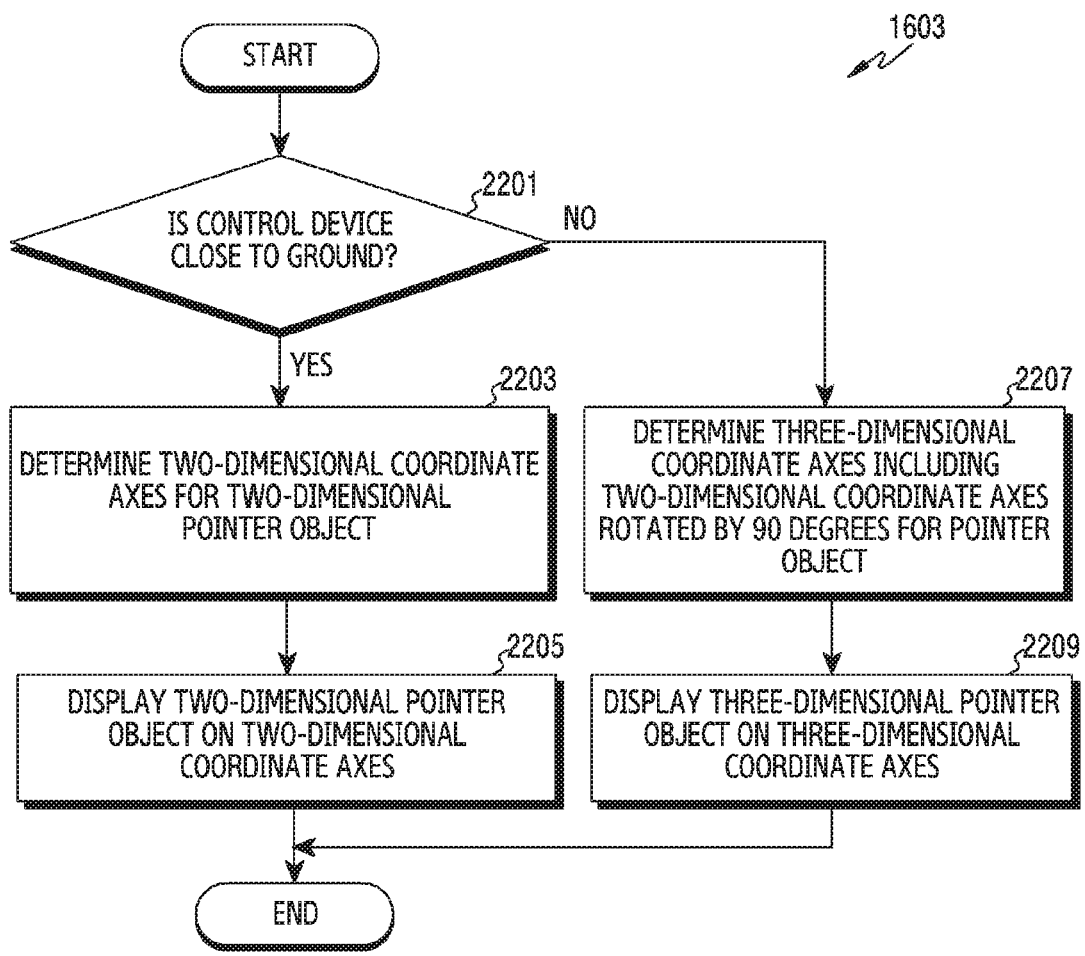
FIG. 22 illustrates a flowchart of an electronic device for determining coordinate axes for displaying a pointer object depending on the distance between a control device and the ground according to various embodiments of the disclosure.

FIG. 22 illustrates a flowchart of an electronic device 101 for determining coordinate axes for displaying a pointer object according to the distance between a control device 102 and the ground according to various embodiments of the disclosure. FIG. 22 illustrates a method of operating the electronic device 101.

Referring to FIG. 22, the electronic device 101 may determine whether or not the control device 102 is close to the ground in operation 2201. That is, the electronic device 101 may determine whether or not the distance between the control device 102 and the ground is less than a threshold value. If the distance between the control device 102 and the ground is less than the threshold value, the control device 102 proceeds to operation 2203. If the distance between the control device 102 and the ground is not less than the threshold value, the control device 102 proceeds to operation 2207.

Figure 23A:
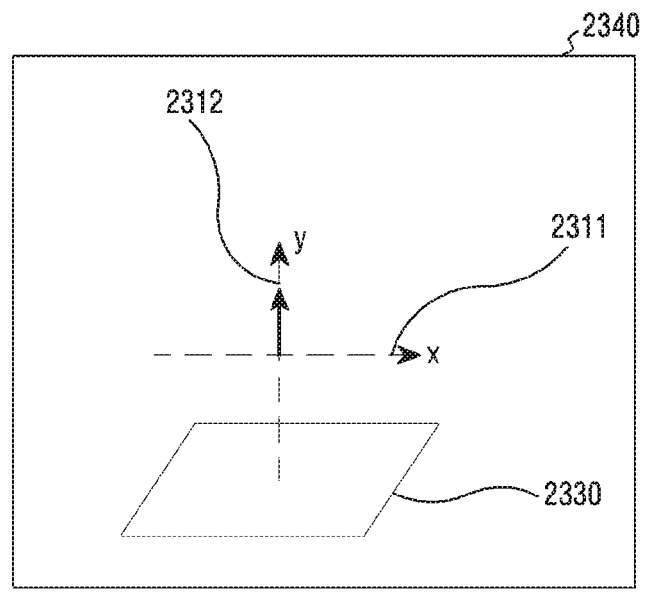
FIGS. 23A and 23B illustrate examples of coordinate axes for displaying a pointer object depending on the distance between a control device and the ground according to various embodiments of the disclosure.
Figure 23A:
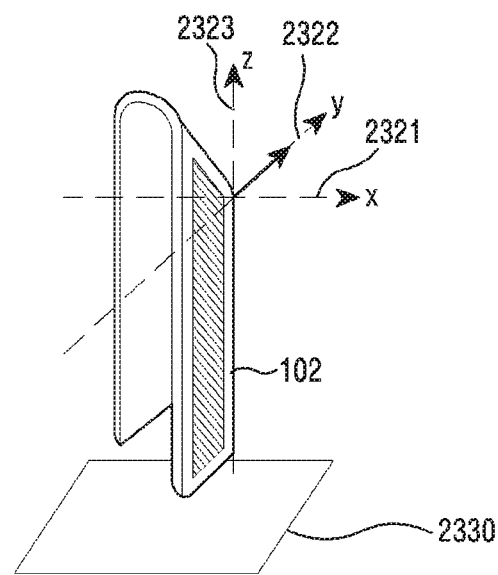

In operation 2203, if the distance between the control device 102 and the ground is less than the threshold value, the electronic device 101 may determine two-dimensional coordinate axes for a two-dimensional pointer object. For example, as shown in FIG. 23A, if the distance between the control device 102 and the ground is less than the threshold value, the electronic device 101 may determine, as two-dimensional coordinate axes, a two-dimensional X-axis 2311, which is parallel with the ground 2330, and a two-dimensional Y-axis 2312, which is perpendicular to the ground 2330, on a two-dimensional screen 2340. The two-dimensional X-axis 2311 and the two-dimensional Y-axis 2312 may be perpendicular to each other. For example, if the user gazes in the direction parallel to the ground with the electronic device 101 worn, the electronic device 101 may be displayed with the two-dimensional X-axis 2311, which is parallel with the ground 2330, and the Y-axis 2312, which is perpendicular to the ground 2330, on the two-dimensional screen 2340.

According to various embodiments, the two-dimensional X-axis 2311 and the ground 2330 may not be limited to the parallel arrangement, and the two-dimensional Y-axis 2312 and the ground 2330 may not be limited to the perpendicular arrangement. The positional state of the electronic device 101 may vary according to the direction in which the user wears the electronic device 101 and at which the user gazes, and the arrangement of the X-axis 2311 and the Y-axis 2312 with respect to the ground on the two-dimensional screen 2340 may be changed.

In operation 2205, the electronic device 101 may display a two-dimensional pointer object that is moving on the two-dimensional screen 2340. More specifically, the electronic device 101 may display a two-dimensional pointer object that is moving in the direction corresponding to the movement direction of the control device 102 on the two-dimensional screen 2340. For example, if the control device 102 moves in the direction of the three-dimensional Y-axis 2322, as shown in FIG. 23A, the electronic device 101 may display a two-dimensional pointer object that is moving in the direction of the two-dimensional Y-axis 2312 corresponding to the direction of the three-dimensional Y-axis 2322. That is, in the case where the distance between the control device 102 and the ground is less than the threshold value, even if the control device 102 moves in the direction of the three-dimensional Y-axis 2322, the two-dimensional pointer object may move in the direction of the two-dimensional Y-axis 2312 obtained by rotating the three-dimensional Y-axis 2322 by 90 degrees.

Figure 23B:
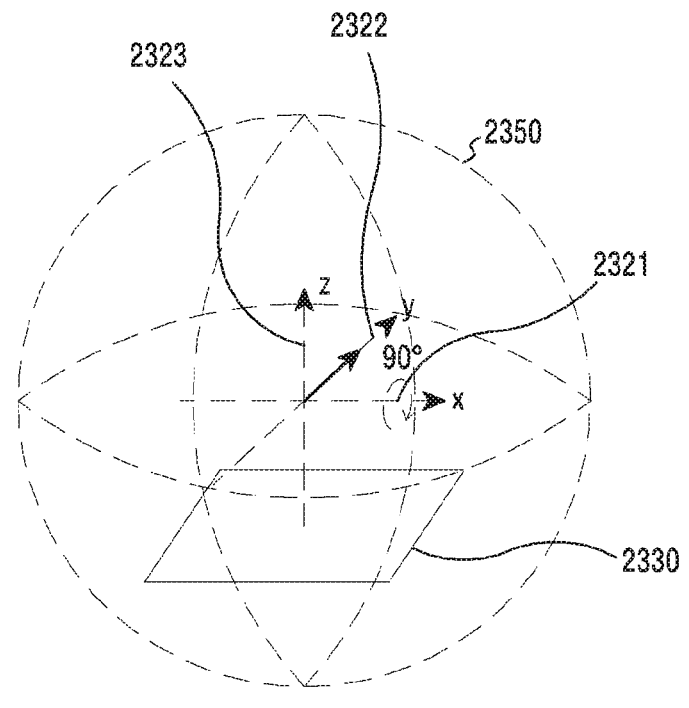
Figure 23B:
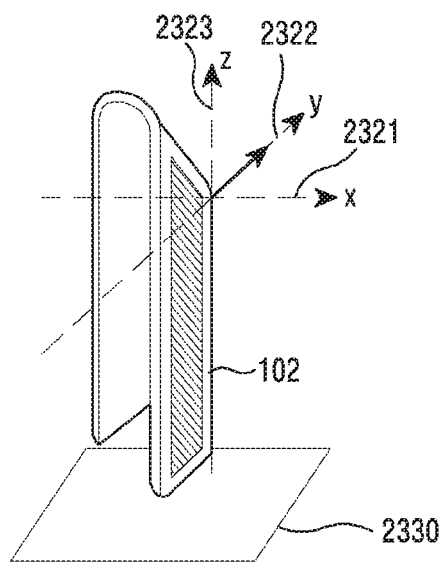

In operation 2207, if the distance between the control device 102 and the ground is not less than the threshold value, the electronic device 101 may determine three-dimensional coordinate axes for the pointer object, which includes two-dimensional coordinate axes that are rotated by 90 degrees, on a three-dimensional screen 2350. For example, as shown in FIG. 23B, the electronic device 101 may determine three-dimensional coordinate axes including a three-dimensional Y-axis 2322 obtained by rotating the two-dimensional Y-axis 2312 by 90 degrees about the two-dimensional X-axis 2311. That is, the electronic device 101 may determine, as the three-dimensional coordinate axes, a three-dimensional X-axis 2321, which is parallel with the ground 2330, a three-dimensional Y-axis 2322, which is parallel with the ground 2330 and is perpendicular to the two-dimensional X-axis 2311, and a three-dimensional Z-axis 2323, which is perpendicular to the ground 2330, on the three-dimensional screen 2350. In this case, as long as the three-dimensional X-axis 2321, the three-dimensional Y-axis 2322, and the three-dimensional Z-axis 2323 are perpendicular to each other, the three-dimensional X-axis 2321 and the three-dimensional Y-axis 2322 may not be limited to the parallel arrangement with respect to the ground 2330, and the three-dimensional Z-axis 2323 and the ground 2330 may not be limited to the perpendicular arrangement. This is due to the fact that if the three-dimensional X-axis 2321, the three-dimensional Y-axis 2322, and the three-dimensional Z-axis 2323 are perpendicular to each other, it is possible to determine the three-dimensional coordinate axes regardless of a relationship between the three-dimensional X-axis 2321, the three-dimensional Y-axis 2322, and the three-dimensional Z-axis 2323 and the ground 2330.

In operation 2209, the electronic device 101 may display a three-dimensional pointer object on the three-dimensional screen 2350. More specifically, the electronic device 101 may display a three-dimensional pointer object that is moving in the same direction as the movement direction of the control device 102 on the three-dimensional screen 2350. For example, as shown in FIG. 23B, if the control device 102 moves in the direction of the three-dimensional Y-axis 2322, the electronic device 101 may display the three-dimensional pointer object that is moving in the direction of the three-dimensional Y-axis 2322 that is the same as the direction of the three-dimensional Y-axis 2322. This is due to the fact that the movement of the control device 102 may be controlled in three dimensions if the distance between the control device 102 and the ground is not less than the threshold value.

According to various embodiments, the electronic device 101 may fix the three-dimensional X-axis 2321, the three-dimensional Y-axis 2322, and the three-dimensional Z-axis 2323 to the three-dimensional screen 2350 regardless of whether or not the user is wearing the electronic device 101 or whether or not the positional state of the electronic device 101 is changed.

Figure 24:
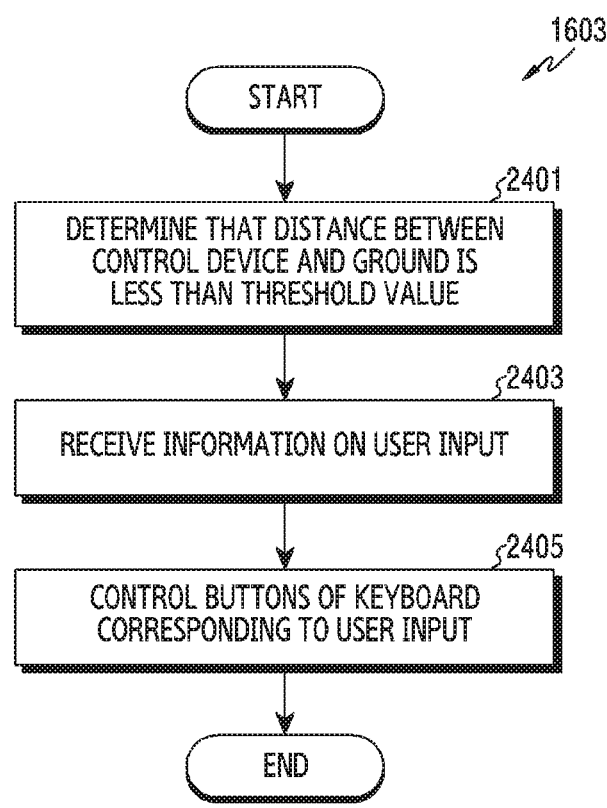
FIG. 24 illustrates a flowchart of an electronic device for controlling a keyboard displayed in an electronic device in response to a user input according to various embodiments of the disclosure.

FIG. 24 illustrates a flowchart of an electronic device 101 for controlling a keyboard displayed in an electronic device 101 in response to a user input according to various embodiments of the disclosure. FIG. 24 illustrates a method of operating the electronic device 101.

Referring to FIG. 24, the electronic device 101 may determine that the distance between the control device 102 and the ground is less than a threshold value in operation 2401. More specifically, the electronic device 101 may receive information about the distance between the control device 102 and the ground from the control device 102, and may determine that the distance between the control device 102 and the ground is less than the threshold value on the basis of the information. The distance information may be information indicating distance itself between the control device 102 and the ground or information indicating that the distance between the control device 102 and the ground is less than the threshold value.

In operation 2403, the electronic device 101 may receive information about a user input from the control device 102. In some embodiments, the electronic device 101 may receive, from the control device 102, information indicating that the user taps on the ground with fingers. For example, if the user taps on the ground once with an index finger, the electronic device 101 may receive information about a click input from the control device 102. As another example, if the user tapes on the ground twice with an index finger, the electronic device 101 may receive information about a double-click input from the control device 102. As another example, if the user swipes down onto the ground with an index finger and a middle finger, the electronic device 101 may receive, from the control device 102, information on a scroll adjustment input in the screen of the electronic device 101. In other embodiments, the electronic device 101 may receive, from the control device 102, information about the position where the user's finger touches the ground.

Figure 25:
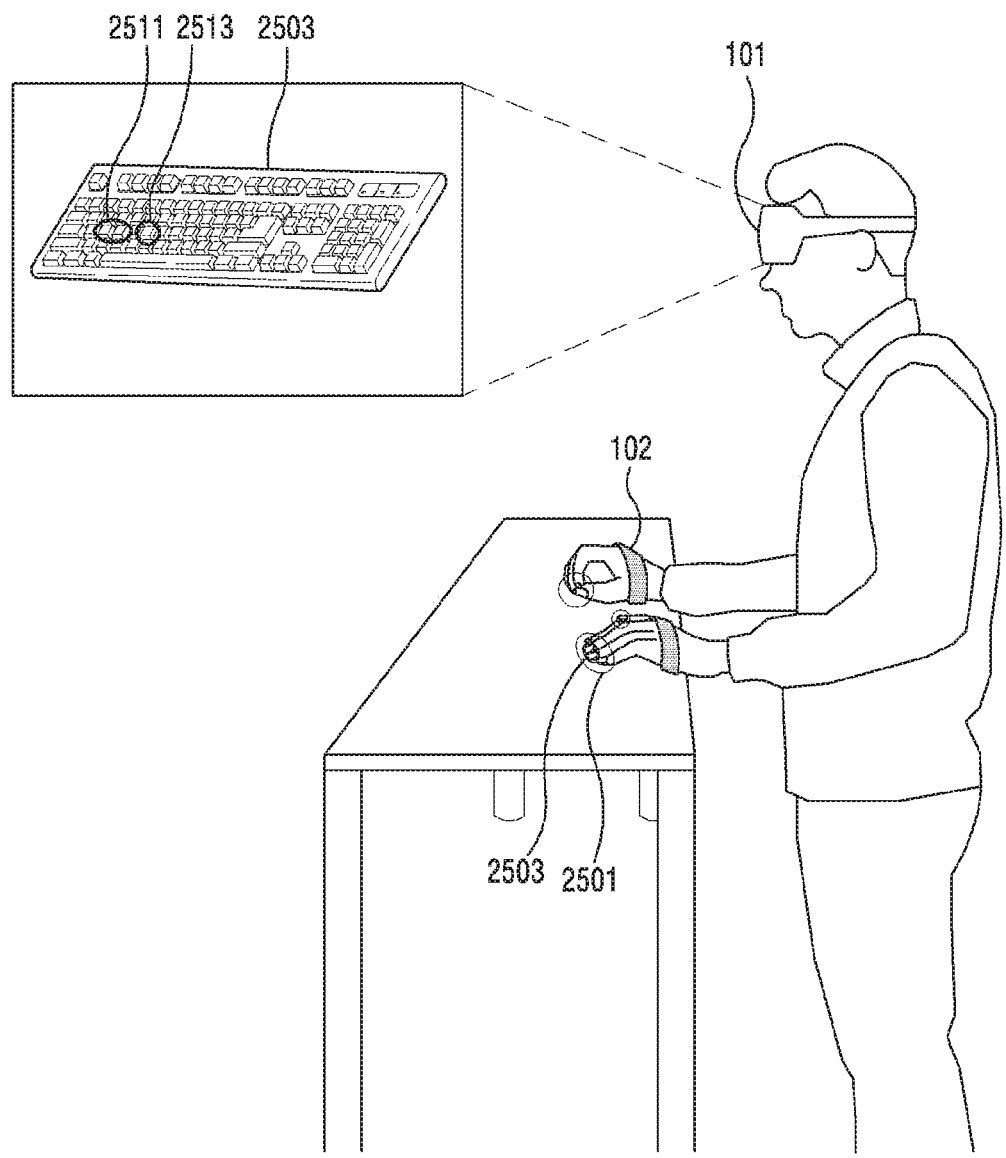
FIG. 25 illustrates an example of a keyboard displayed in an electronic device controlled in response to a user input according to various embodiments of the disclosure.

In operation 2405, the electronic device 101 may control buttons of a keyboard corresponding to the information about the user input. For example, as shown in FIG. 25, if a user taps on one portion of a desk once with a finger 2501 and taps on another portion of the desk with another finger 2503, the electronic device 101 may perform control of pressing a first button 2511 of a keyboard to correspond to the position where the finger 2501 touches the desk, and may perform control of pressing a second button 2513 adjacent to the first button 25100 to correspond to the position where the finger 2503 touches the desk. That is, on the basis of the relativeness between the position where the finger 2501 touches the desk and the position where the finger 2503 touches the desk, the electronic device 101 may perform control of pressing the buttons of the keyboard corresponding to the respective positions.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. A method of operating an electronic device, the method comprising:
    measuring a distance, by a first sensor, between the electronic device and a ground;
    in case that the distance is less than a threshold value, transmitting, to another electronic device, first information about two-dimensional coordinates indicating a position of the electronic device; and
    in case that the distance is greater than or equal to the threshold value, transmitting, to the another electronic device, second information about the three-dimensional coordinates indicating the position of the electronic device,
    wherein the first information and the second information are determined by a second sensor based on original signals received from the another electronic device.

2. The method of claim 1, wherein the transmitting of the first information comprises transmitting, to the another electronic device, the second information and information indicating that the distance between the electronic device and the ground is less than the threshold value.

3. The method of claim 1, wherein the transmitting of the second information comprises transmitting, to the another electronic device, the second information and information indicating that the distance between the electronic device and the ground is greater than or equal to the threshold value.

4. The method of claim 1, further comprising:
    detecting, by a third sensor, motion of at least a part of a user's body; and
    transmitting information about the detected motion to the another electronic device.

5. The method of claim 4, wherein at least the part of a user's body is a finger of the user.

6. The method of claim 4, wherein the motion comprises a gesture by which the user taps on the ground using user's fingers.

7. The method of claim 4, wherein the motion comprises a gesture by which the user swipes down onto the ground using user's fingers.

8. An electronic device comprising:
    a communication module;
    a first sensor;

a second sensor; and a processor, wherein the processor is configured to:

measure a distance between the electronic device and a ground using the first sensor;

in case that the distance is less than a threshold value, transmit, to another electronic device, first information about two-dimensional coordinates indicating a position of the electronic device through the communication module; and in case that the distance is greater than or equal to the threshold value, transmit, to the another electronic device, second information about the three-dimensional coordinates indicating the position of the electronic device through the communication module, wherein the first information and the second information are determined by the second sensor based on original signals received from the another electronic device.

9. The electronic device of claim 8, wherein the processor is configured to, in case that the distance is less than the threshold value, transmit, to the another electronic device, the second information and information indicating that the distance between the electronic device and the ground is less than the threshold value through the communication module.

10. The electronic device of claim 8, wherein the processor is configured to, in case that the distance is greater than or equal to the threshold value, transmit, to the another electronic device, the second information and information indicating that the distance between the electronic device and the ground is greater than or equal to the threshold value through the communication module.

11. The electronic device of claim 8, further comprising a third sensor, wherein the processor is configured to:

detect motion of at least a part of a user's body through the third sensor; and transmit information about the detected motion to the another electronic device through the communication module.

12. The electronic device of claim 11, wherein the motion comprises a gesture by which the user taps on the ground using user's fingers.

13. The electronic device of claim 11, wherein the motion comprises a gesture by which the user swipes down onto the ground using user's fingers.

14. A method of operating an electronic device, the method comprising:

detecting a movement of another electronic device on a first axis;

transmitting original signals to the another electronic device;

in case that a distance between the another electronic device and a ground is less than a threshold value, displaying a two-dimensional object moving on a second axis in response to the movement; and in case that the distance is greater than or equal to the threshold value, displaying a three-dimensional object moving on the first axis in response to the movement.

15. The method of claim 14, wherein displaying the two-dimensional object moving on the second axis in response to the movement comprises:

determining a two-dimensional coordinate axis for displaying the two-dimensional object; and displaying, on the two-dimensional coordinate axis, the two-dimensional object moving in a direction corresponding to a movement direction of the another electronic device.

16. The method of claim 14, wherein displaying the three-dimensional object moving on the first axis comprises:

determining a three-dimensional coordinate axis for displaying the three-dimensional object; and displaying, the three-dimensional coordinate axis, the three-dimensional object moving in a direction corresponding to a movement direction of the another electronic device.

17. The method of claim 14, wherein the first axis comprises an axis perpendicular to the front of the electronic device.

* * * * *